US011178726B2

(12) United States Patent
Damnjanovic

(10) Patent No.: US 11,178,726 B2
(45) Date of Patent: Nov. 16, 2021

(54) USER EQUIPMENT COOPERATIVE MULTIPOINT RECEPTION AND TRANSMISSION

(71) Applicant: QUALCOMM Incorporated, San Diego, CA (US)

(72) Inventor: Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/656,561

(22) Filed: Oct. 17, 2019

(65) Prior Publication Data
US 2020/0128619 A1    Apr. 23, 2020

Related U.S. Application Data

(60) Provisional application No. 62/748,375, filed on Oct. 19, 2018.

(51) Int. Cl.
*H04W 88/04* (2009.01)
*H04B 7/024* (2017.01)
(Continued)

(52) U.S. Cl.
CPC ............ *H04W 88/04* (2013.01); *H04B 7/024* (2013.01); *H04B 7/026* (2013.01); *H04B 7/0413* (2013.01);
(Continued)

(58) Field of Classification Search
CPC ...... H04B 7/024; H04B 7/026; H04B 7/0413; H04B 7/0404; H04L 5/0035;
(Continued)

(56) References Cited

U.S. PATENT DOCUMENTS

| 10,277,370 B2* | 4/2019 | Moshfeghi | H04B 1/40 |
| 2010/0238823 A1* | 9/2010 | Chen | H04L 1/1822 370/252 |

(Continued)

OTHER PUBLICATIONS

International Search Report and Written Opinion—PCT/US2019/056964—ISA/EPO—dated Jan. 23, 2020.

*Primary Examiner* — Mohamed A Kamara
(74) *Attorney, Agent, or Firm* — Holland & Hart LLP/Qualcomm Incorporated

(57) ABSTRACT

Methods, systems, and devices for wireless communication are described. Generally, the described techniques performed at a user equipment (UE) provide for communicating directly with a base station using a first set of antennas and communicating indirectly with the base station (e.g., via a wireless node, a remote radio head, etc.) using a second set of antennas to fully exploit the potential capabilities of the physical antennas at the UE. For downlink communications, a UE may receive at least a subset of downlink signals from a base station via a wireless node, and, for uplink communications, the UE may transmit at least a subset of uplink signals to the base station via a wireless node. To facilitate these techniques, the UE may configure the wireless node to forward downlink signals received from the base station to the UE or to forward uplink signals received from the UE to the base station.

34 Claims, 21 Drawing Sheets

(51) Int. Cl.
    *H04B 7/026*     (2017.01)
    *H04B 7/0413*    (2017.01)
    *H04L 5/00*      (2006.01)
    *H04W 88/06*     (2009.01)
    *H04L 1/18*      (2006.01)
    *H04W 92/10*     (2009.01)

(52) U.S. Cl.
    CPC ........... *H04L 5/0035* (2013.01); *H04W 88/06* (2013.01); *H04L 1/1812* (2013.01); *H04W 92/10* (2013.01)

(58) Field of Classification Search
    CPC ................ H04L 1/1812; H04L 1/1893; H04L 2001/0097; H04L 5/0053; H04L 5/001; H04L 5/0044; H04W 88/06; H04W 92/10; H04W 84/047; H04W 40/24; H04W 40/246; H04W 40/22
    See application file for complete search history.

(56) References Cited

U.S. PATENT DOCUMENTS

| | | | |
|---|---|---|---|
| 2010/0265874 A1 | 10/2010 | Palanki et al. | |
| 2010/0316002 A1 | 12/2010 | Nagaraja | |
| 2013/0016649 A1* | 1/2013 | Damnjanovic | H04W 88/04 370/315 |
| 2015/0172846 A1* | 6/2015 | Ge | H04L 67/12 370/254 |
| 2017/0111952 A1 | 4/2017 | Choi | |
| 2017/0163331 A1 | 6/2017 | Breiling et al. | |
| 2017/0163333 A1 | 6/2017 | Breiling et al. | |
| 2017/0295517 A1* | 10/2017 | Nguyen | H04L 5/0055 |
| 2018/0294867 A1 | 10/2018 | Schwab et al. | |

\* cited by examiner

USER EQUIPMENT COOPERATIVE MULTIPOINT RECEPTION AND TRANSMISSION

CROSS REFERENCE

The present Application for Patent claims the benefit of U.S. Provisional Patent Application No. 62/748,375 by DAMNJANOVIC, entitled "USER EQUIPMENT COOPERATIVE MULTIPOINT RECEPTION AND TRANSMISSION," filed Oct. 19, 2018, assigned to the assignee hereof, and expressly incorporated herein.

INTRODUCTION

The following relates generally to wireless communications and more specifically to cooperative or coordinated multipoint (CoMP) reception and transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UEs). In some wireless communications, a UE may communicate with a base station using physical antennas located at the UE. For instance, the UE may use the antennas to transmit uplink signals to the base station or to receive downlink signals from the base station. Conventional techniques at a UE for communicating with a base station may not fully exploit the potential capabilities of the physical antennas at the UE (i.e., the UE hardware).

SUMMARY

A method for wireless communication at a UE is described. The method may include identifying a first band to communicate with a base station and a second band to communicate with a wireless node, configuring the wireless node to forward one or more downlink signals, received from the base station on the first band, to the UE on the second band or to forward one or more uplink signals, received from the UE on the second band, to the base station on the first band, and communicating with the base station on the first band and the wireless node on the second band based on the configuring.

An apparatus for wireless communication at a UE is described. The apparatus may include a processor and memory coupled with the processor. The processor and memory may be configured to identify a first band to communicate with a base station and a second band to communicate with a wireless node, configure the wireless node to forward one or more downlink signals, received from the base station on the first band, to the UE on the second band or to forward one or more uplink signals, received from the UE on the second band, to the base station on the first band, and communicate with the base station on the first band and the wireless node on the second band based on the configuring.

Another apparatus for wireless communication at a UE is described. The apparatus may include means for identifying a first band to communicate with a base station and a second band to communicate with a wireless node, configuring the wireless node to forward one or more downlink signals, received from the base station on the first band, to the UE on the second band or to forward one or more uplink signals, received from the UE on the second band, to the base station on the first band, and communicating with the base station on the first band and the wireless node on the second band based on the configuring.

A non-transitory computer-readable medium storing code for wireless communication at a UE is described. The code may include instructions executable by a processor to identify a first band to communicate with a base station and a second band to communicate with a wireless node, configure the wireless node to forward one or more downlink signals, received from the base station on the first band, to the UE on the second band or to forward one or more uplink signals, received from the UE on the second band, to the base station on the first band, and communicate with the base station on the first band and the wireless node on the second band based on the configuring.

In some examples of the method, apparatuses, and non-transitory computer-readable medium described herein, configuring the wireless node to forward the one or more downlink signals or the one or more uplink signals includes transmitting, from the UE, a configuration message to the wireless node indicating that the wireless node is to forward the one or more downlink signals to the UE and forward the one or more uplink signals to the base station. In some examples of the method, apparatuses, and non-transitory computer-readable medium described herein, communicating with the base station on the first band and the wireless node on the second band includes communicating directly with the base station on the first band and communicating indirectly with the base station via the wireless node on the second band using virtual multiple-input multiple-output (MIMO). In some examples of the method, apparatuses, and non-transitory computer-readable medium described herein, the wireless node is a remote radio head for the UE.

In some examples of the method, apparatuses, and non-transitory computer-readable medium described herein, the communicating may include operations, features, means, or instructions for determining that the one or more downlink signals may be scheduled to be transmitted to the UE from the base station on the first band, and receiving, from the wireless node on the second band, at least a subset of the one or more downlink signals scheduled to be transmitted to the UE from the base station.

In some examples of the method, apparatuses, and non-transitory computer-readable medium described herein, the receiving may include operations, features, means, or instructions for receiving, from the wireless node on the second band, all of the one or more downlink signals scheduled to be transmitted to the UE from the base station. In some examples of the method, apparatuses, and non-transitory computer-readable medium described herein, the receiving may include operations, features, means, or instructions for receiving, from the base station on the first band, a first subset of the one or more downlink signals scheduled to be transmitted to the UE from the base station, and receiving, from the wireless node on the second band, a second subset of the one or more downlink signals scheduled to be transmitted to the UE from the base station.

In some examples of the method, apparatuses, and non-transitory computer-readable medium described herein, configuring the wireless node to forward the at least the subset of the one or more downlink signals may include operations, features, means, or instructions for configuring the wireless node to forward the at least the subset of the one or more downlink signals scheduled to be transmitted to the UE from the base station.

In some examples of the method, apparatuses, and non-transitory computer-readable medium described herein, the communicating may include operations, features, means, or instructions for identifying the one or more uplink signals to be transmitted to the base station, and transmitting at least a subset of the one or more uplink signals to the wireless node on the second band, where the at least the subset of the one or more uplink signals may be to be forwarded by the wireless node to the base station on the first band.

In some examples of the method, apparatuses, and non-transitory computer-readable medium described herein, the transmitting may include operations, features, means, or instructions for transmitting all of the one or more uplink signals to the wireless node on the second band, where all of the one or more uplink signals may be to be forwarded by the wireless node to the base station on the first band. Some examples of the method, apparatuses, and non-transitory computer-readable medium described herein may further include operations, features, means, or instructions for transmitting a first subset of the one or more uplink signals to the base station on the first band, and transmitting a second subset of the one or more uplink signals to the wireless node on the second band, where the second subset of the one or more uplink signals may be to be forwarded by the wireless node to the base station on the first band.

In some examples of the method, apparatuses, and non-transitory computer-readable medium described herein, configuring the wireless node to forward the one or more uplink signals may include operations, features, means, or instructions for configuring the wireless node to forward the at least the subset of the one or more uplink signals transmitted to the wireless node on the second band to the base station on the first band.

In some examples of the method, apparatuses, and non-transitory computer-readable medium described herein, configuring the wireless node to forward the one or more downlink signals or the one or more uplink signals may include operations, features, means, or instructions for configuring a format for forwarding the one or more downlink signals or the one or more uplink signals. In some examples of the method, apparatuses, and non-transitory computer-readable medium described herein, the one or more downlink signals or the one or more uplink signals may be forwarded in the form of raw or compressed in-phase (I) and quadrature (Q) samples of the one or more downlink signals or the one or more uplink signals. In some examples of the method, apparatuses, and non-transitory computer-readable medium described herein, the one or more downlink signals may be forwarded in the form of decoded transport blocks, decoded control information, or both.

Some examples of the method, apparatuses, and non-transitory computer-readable medium described herein may further include operations, features, means, or instructions for communicating with the base station to determine an updated hybrid automatic repeat request (HARQ) timeline for providing HARQ feedback to the base station for the one or more downlink signals. In some examples of the method, apparatuses, and non-transitory computer-readable medium described herein, the UE may be configured to communicate with the base station on the first band using a first set of antennas, and the UE may be configured to communicate with the wireless node on the second band using a second, additional set of antennas.

A method for wireless communication at a wireless node is described. The method may include identifying a first band to be used for communications between a UE and a base station and a second band to be used for communications between the wireless node and the UE, receiving, from the UE, a configuration for forwarding one or more downlink signals, received from the base station on the first band, to the UE on the second band or for forwarding one or more uplink signals, received from the UE on the second band, to the base station on the first band, and communicating with the base station on the first band and the UE on the second band based on the configuration.

An apparatus for wireless communication at a wireless node is described. The apparatus may include a processor and memory coupled with the processor. The processor and memory may be configured to identify a first band to be used for communications between a UE and a base station and a second band to be used for communications between the wireless node and the UE, receive, from the UE, a configuration for forwarding one or more downlink signals, received from the base station on the first band, to the UE on the second band or for forwarding one or more uplink signals, received from the UE on the second band, to the base station on the first band, and communicate with the base station on the first band and the UE on the second band based on the configuration.

Another apparatus for wireless communication at a wireless node is described. The apparatus may include means for identifying a first band to be used for communications between a UE and a base station and a second band to be used for communications between the wireless node and the UE, receiving, from the UE, a configuration for forwarding one or more downlink signals, received from the base station on the first band, to the UE on the second band or for forwarding one or more uplink signals, received from the UE on the second band, to the base station on the first band, and communicating with the base station on the first band and the UE on the second band based on the configuration.

A non-transitory computer-readable medium storing code for wireless communication at a wireless node is described. The code may include instructions executable by a processor to identify a first band to be used for communications between a UE and a base station and a second band to be used for communications between the wireless node and the UE, receive, from the UE, a configuration for forwarding one or more downlink signals, received from the base station on the first band, to the UE on the second band or for forwarding one or more uplink signals, received from the UE on the second band, to the base station on the first band, and communicate with the base station on the first band and the UE on the second band based on the configuration.

In some examples of the method, apparatuses, and non-transitory computer-readable medium described herein, communicating with the base station on the first band and the UE on the second band includes forwarding the one or more downlink signals from the base station to the UE and the one or more uplink signals from the UE to the base station to facilitate indirect communications between the UE and the base station using virtual multiple-input multiple-output. In some examples of the method, apparatuses, and non-transitory computer-readable medium described herein, the wireless node is a remote radio head for the UE. In some examples of the method, apparatuses, and non-transitory computer-readable medium described herein, the communicating may include operations, features, means, or instructions for monitoring the first band for the one or more downlink signals scheduled to be transmitted by the base station to the UE on the first band, receiving the one or more downlink signals on the first band, and transmitting, to the UE on the second band, at least a subset of the one or more downlink signals received on the first band.

In some examples of the method, apparatuses, and non-transitory computer-readable medium described herein, the transmitting may include operations, features, means, or instructions for transmitting, to the UE on the second band, all of the one or more downlink signals received on the first band. In some examples of the method, apparatuses, and non-transitory computer-readable medium described herein, a first subset of the one or more downlink signals received on the first band may be received by the UE from the base station on the first band, and where the transmitting may include operations, features, means, or instructions for transmitting, to the UE on the second band, a second subset of the one or more downlink signals received on the first band. In some examples of the method, apparatuses, and non-transitory computer-readable medium described herein, the configuration for forwarding the one or more downlink signals or the one or more uplink signals, received from the UE, indicates that the wireless node may be to forward the at least the subset of the one or more downlink signals to the UE.

In some examples of the method, apparatuses, and non-transitory computer-readable medium described herein, the communicating may include operations, features, means, or instructions for monitoring the second band for the one or more uplink signals from the UE to be forwarded to the base station on the first band, receiving the one or more uplink signals on the second band, and transmitting the one or more uplink signals received on the second band to the base station on the first band.

In some examples of the method, apparatuses, and non-transitory computer-readable medium described herein, the configuration for forwarding the one or more downlink signals or the one or more uplink signals, received from the UE, indicates a format for forwarding the one or more downlink signals or the one or more uplink signals. In some examples of the method, apparatuses, and non-transitory computer-readable medium described herein, the one or more downlink signals or the one or more uplink signals may be forwarded in the form of raw or compressed I & Q samples of the one or more downlink signals or the one or more uplink signals based on the configuration. In some examples of the method, apparatuses, and non-transitory computer-readable medium described herein, the one or more downlink signals may be forwarded in the form of decoded transport blocks, decoded control information, or both based on the configuration. In some examples of the method, apparatuses, and non-transitory computer-readable medium described herein, the configuration for forwarding the one or more downlink signals or the one or more uplink signals may be received from the UE or the base station.

DETAILED DESCRIPTION

Some wireless communications may support communication between UEs and base stations on multiple bands. In such systems, UEs may be configured to use one set of antennas to communicate on one band and another set of antennas to communicate on a different band. In some cases, a UE may have a direct link to a base station on one band (e.g., on a sub-7 GHz band) and may not communicate with the base station using the antennas designed for communicating on another band (e.g., on a millimeter wave (mmW) band). Thus, the UE may not fully exploit the potential capabilities of the antennas at the UE, which may be detrimental to the UE (e.g., in poor radio conditions). That is, the quality of a direct link with a base station may limit the maximum throughput or data rate of communications with the base station, and the throughput or data rate may be further limited by the number of antennas being used to communicate.

As described herein, a wireless communications system may support efficient techniques for maximizing throughput. In particular, the described techniques performed at a UE provide for communicating directly with a base station using a first set of antennas and communicating indirectly with the base station (e.g., via a wireless node, a relay, a remote radio head, etc.) using a second set of antennas to fully exploit the potential capabilities of the physical antennas at the UE. These techniques may be referred to as UE CoMP techniques, where the UE (e.g., rather than a base station) may configure the wireless node to forward uplink signals from the UE to a base station or to forward downlink signals from a base station to a UE. In addition, because the full set of antennas used to communicate with the base station may include antennas at the UE and antennas at the wireless node (e.g., used to forward signals to or from the UE), communications between the UE and the base station may be referred to as virtual MIMO communications. For downlink communications, a UE may receive at least a subset of downlink signals from a base station via a wireless node, and, for uplink communications, the UE may transmit at least a subset of uplink signals to the base station via a wireless node. Thus, the wireless node may be a remote radio head for the UE.

Aspects of the disclosure introduced above are described below in the context of a wireless communications system. Examples of processes and signaling exchanges that support UE CoMP reception and transmission are then described. Aspects of the disclosure are further illustrated by and described with reference to apparatus diagrams, system diagrams, and flowcharts that relate to UE CoMP reception and transmission.

Figure 1:
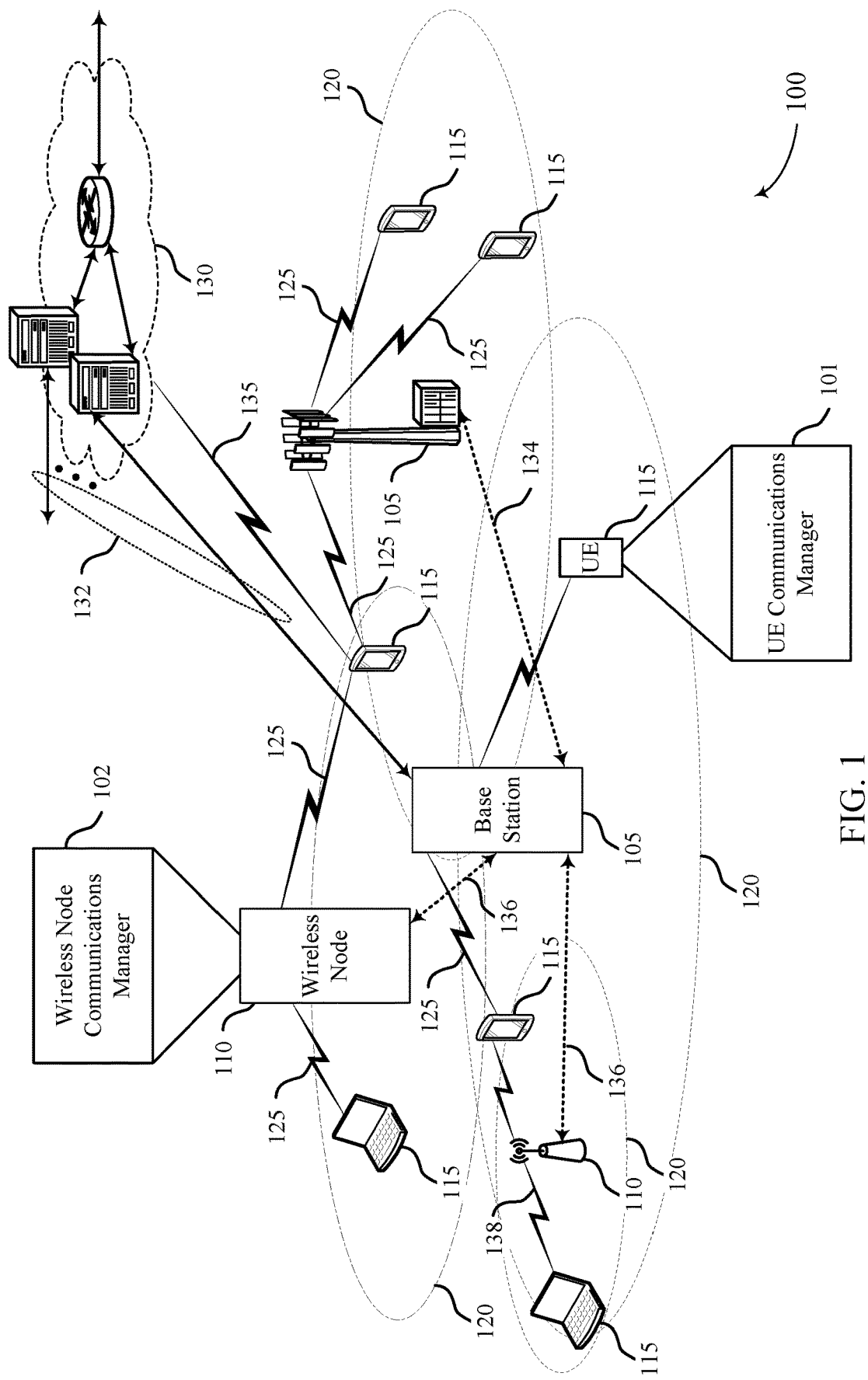
FIGS. 1-3 illustrate examples of wireless communications systems that support UE CoMP reception and transmission in accordance with one or more aspects of the present disclosure.

FIG. 1 illustrates an example of a wireless communications system 100 that supports UE CoMP reception and transmission in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 120 in which communications with various UEs 115 is supported. Each base station 105 may provide communication coverage for a respective geographic coverage area 120 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. A UE 115 may communicate with the core network 130 through communication link 135. Downlink transmissions may also be called forward link transmissions while uplink transmissions may also be called reverse link transmissions. A UE 115 may communicate with the core network 130 through communication link 135.

The geographic coverage area 120 for a base station 105 may be divided into sectors making up only a portion of the geographic coverage area 120, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 120. In some examples, different geographic coverage areas 120 associated with different technologies may overlap, and overlapping geographic coverage areas 120 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 120.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 120 (e.g., a sector) over which the logical entity operates.

UEs 115 may be dispersed throughout the wireless communications system 100, and each UE 115 may be stationary or mobile. A UE 115 may also be referred to as a mobile device, a wireless device, a wireless node, a remote radio head, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 120 of a base station 105. Other UEs 115 in such a group may be outside the geographic coverage area 120 of a base station 105 or may be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130). Further, base stations 105 may communicate with wireless nodes 110 via direct links 136, and the wireless nodes 110 may communicate with UEs 115 over backhaul links 138 (e.g., mobile backhaul links). The wireless nodes may be dispersed throughout the wireless communications system 100 and may serve as a relay for communications (e.g., a small cell in a licensed or unlicensed layer) between a base station 105 and a UE 115 to improve coverage and throughput in the system. In some cases, a wireless node 110 may be a remote radio head for the UE 115. A wireless node 110 may be a UE 115 (e.g., a cellular phone, a wearable device, etc.) and may be installed by users (e.g., without any control of the operator) to improve cellular coverage.

UE 115 may include UE communications manager 101, which may identify a first band to communicate with a base station 105 and a second band to communicate with a wireless node 110, configure the wireless node to forward one or more downlink signals received from the base station 105 on the first band to the UE 115 on the second band or to forward one or more uplink signals received from the UE 115 on the second band to the base station 105 on the first band, and communicate with the base station 105 on the first band and the wireless node 110 on the second band based at least in part on the configuring.

Wireless node 110 may include wireless node communications manager 102, which may identify a first band to be used for communications between a UE 115 and a base station 105 and a second band to be used for communications between the wireless node 110 and the UE 115, receive a configuration for forwarding one or more downlink signals received from the base station 105 on the first band to the UE 115 on the second band or for forwarding one or more uplink signals received from the UE 115 on the second band to the base station 105 on the first band, and communicate with the base station 105 on the first band and the UE 115 on the second band based at least in part on the configuration.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

The term "carrier", "frequency band", or "band" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

UEs 115 in the wireless communications system 100 may be configured to use one set of antennas to communicate on one band and another set of antennas to communicate on a different band. For instance, UEs 115 may communicate on a sub-7 GHz band using one set of antennas and a mmW band using another set of antennas, or UEs 115 may communicate on different mmW bands using different sets of antennas. In some cases, a UE 115 may have a direct link to a base station 105 on one band (e.g., on a sub-7 GHz band) and may not communicate with the base station 105 using the antennas designed for communicating on another band (e.g., on a mmW band). Thus, the UE 115 may not fully exploit the potential capabilities of the antennas at the UE, which may be detrimental to the UE (e.g., in poor radio conditions where the data rate is limited due to using a low rank and a low modulation and coding scheme (MCS) to improve reliability). Wireless communications system 100 may support efficient techniques at a UE 115 for using additional or alternative antennas for communicating with a base station 105 to improve throughput. These techniques may be referred to as UE CoMP techniques.

Figure 2:
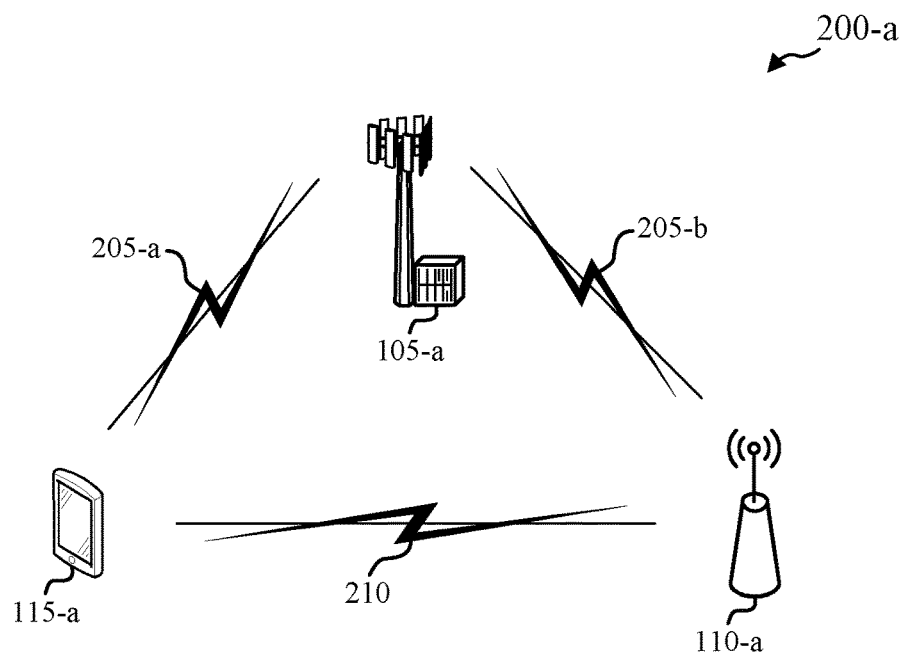
Figure 2:
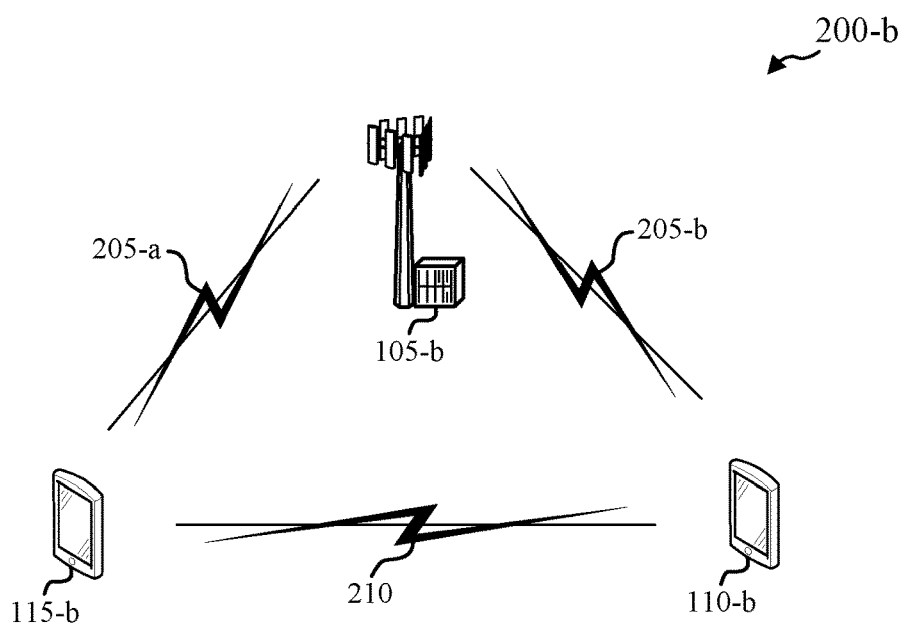

FIG. 2 illustrates examples of wireless communications systems 200 that support UE CoMP reception and transmission in accordance with one or more aspects of the present disclosure. Wireless communications systems 200 may support communications between base stations 105, UEs 115 (e.g., serving UEs 115), and wireless nodes 110, which may be examples of the corresponding devices described with reference to FIG. 1. Wireless communications systems 200 may implement aspects of wireless communications system 100. For example, wireless communications systems 200 may support efficient techniques at a UE 115 for using additional or alternative antennas for communicating with a base station 105 to improve throughput (e.g., where procedures at the base station 105 may not change).

In the example of FIG. 2, UE 115-a may communicate directly with base station 105-a over a direct link 205-a using a first set of antennas (e.g., on a sub-7 GHz band, a first mmW band, a licensed band, etc.), and UE 115-a may communicate indirectly with base station 105 via a wireless node 110-a using a second set of antennas (e.g., on a mmW band, a second mmW band, an unlicensed band, etc.). In wireless communications system 200-a, the wireless node 110-a may be an example of a relay node 110-a, and, in wireless communications system 200-b, the wireless node 110-b may be an example of a UE 110-b (e.g., a non-serving UE 110-b). In some cases, the wireless nodes 110 may be remote radio heads for the UE 115. The wireless nodes 110 may derive reference timing for communicating with base stations 105 and UEs 115 from synchronization signal blocks (SSBs) received from base stations 105.

The indirect communications between the UE 115 and the base station 105 may include communications between the UE 115 and the wireless node 110 over a backhaul link 210 (e.g., a mobile backhaul link 210) using the second set of antennas (e.g., on the mmW band) and communications between the wireless node 110 and the base station 105 over a direct link 205-b. That is, a UE 115 may configure a wireless node 110 to operate as a remote radio head for the UE 115. Because the UE 115 may support indirect communication with the base station 105 via the wireless node 110, the UE 115 may be able to use additional antennas to communicate with the base station 105-a (i.e., the second set of antennas in addition to the first set of antennas), resulting in improved throughput.

Figure 3:
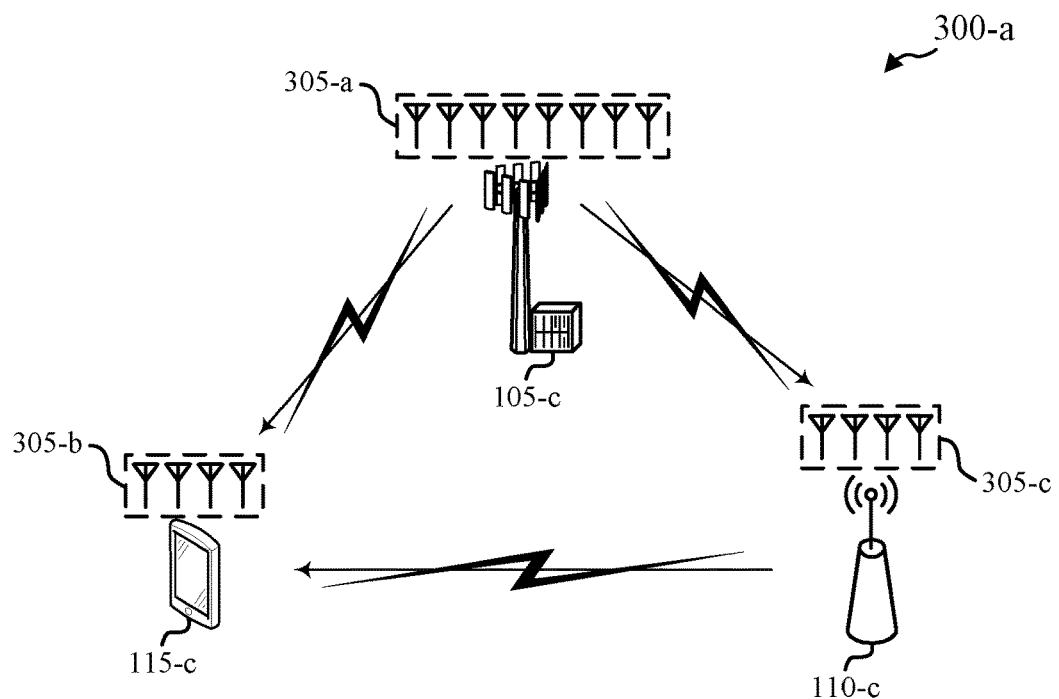
Figure 3:
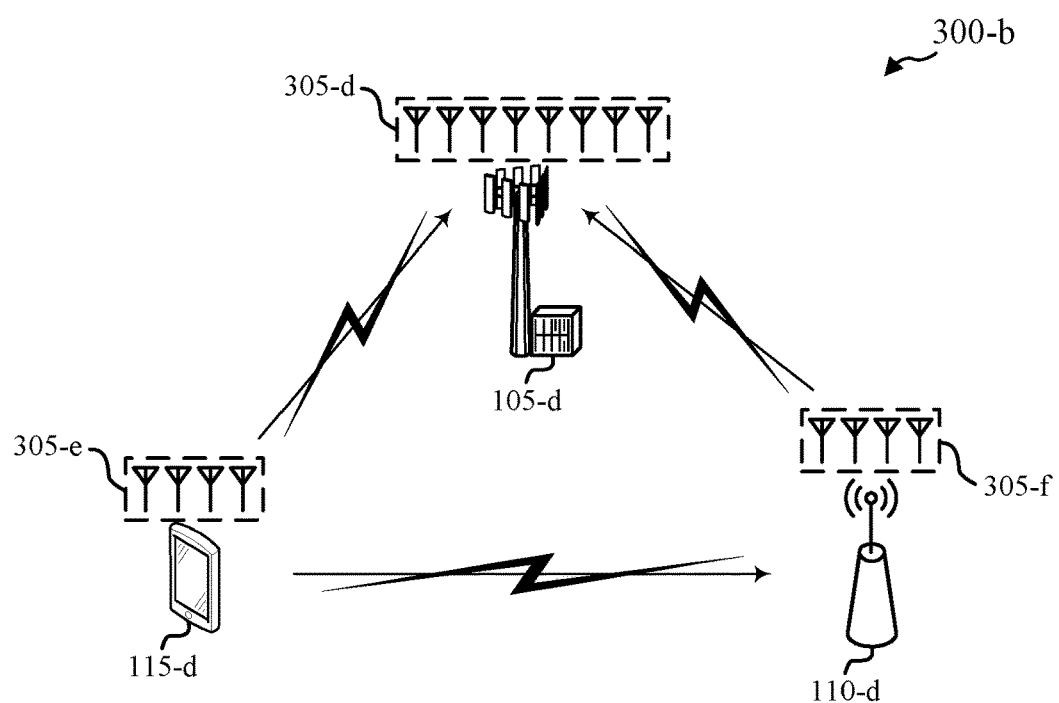

FIG. 3 illustrates examples of antennas 305 used for communications between a UE 115 and a base station 105 and antennas 305 used for communications between a wireless node 110 (e.g., a relay, a remote radio head, etc.) and a base station 105 in wireless communications systems 300 in accordance with one or more aspects of the present disclosure. Wireless communications systems 300 may support communications between base stations 105, UEs 115, and wireless nodes 110, which may be examples of the corresponding devices described with reference to FIGS. 1 and 2. Wireless communications system 300-a illustrates downlink communications between base station 105-c and UE 115-c (e.g., direct and indirect downlink communications), and wireless communications system 300-b illustrates uplink communications between UE 115-*d* and base station 105-*d* (e.g., direct and indirect downlink communications).

In wireless communications system 300-*a*, base station 105-*c* may transmit downlink signals intended for UE 115-*c* on a first band (e.g., a sub-7 GHz band) using 8 transmit antennas 305-*a*. However, UE 115-*c* may have access to four receive antennas 305-*b* to receive signals on the first band, and other antennas at the UE 115-*c* (not shown) configured to communicate on a second band may not be used. Thus, UE 115-*c* may only be able to receive a first subset of the downlink signals on the four receive antennas 305-*b*. As described herein, to improve throughput in wireless communications system 300-*a*, wireless node 110-*c* may monitor the first band and may receive a second subset of the downlink signals on four antennas 305-*c*, and wireless node 110-*c* may forward the second subset of the downlink signals to UE 115-*c* on the second band. Accordingly, UE 115-*c* may use the other antennas configured to communicate on the second band to receive the second subset of the downlink signals from the wireless node 110-*c*. That is, the antennas 305-*b* at the UE 115-*c* and the antennas 305-*c* at the wireless node 110-*c* may effectively be joint together, and the effective number of antennas at the UE can be increased (e.g., resulting in 8 transmit antennas and 8 receive antennas in wireless communications system 300-*a*). Communications with a base station on such a joint set of antennas may be referred to as virtual MIMO communications.

In wireless communications system 300-*b*, UE 115-*d* may be scheduled to transmit uplink signals to base station 105-*d* on a first band. However, UE 115-*d* may only have access to four transmit antennas 305-*e* to transmit uplink signals on the first band, and other antennas at the UE 115-*d* (not shown) configured to communicate on a second band may not be used. Thus, UE 115-*d* may only be able to transmit a first subset of the uplink signals on the four transmit antennas 305-*e*. As described herein, to improve throughput in wireless communications system 300-*b*, UE 115-*d* may transmit a second subset of the uplink signals to wireless node 110-*d* on the second band using the other antennas configured to communicate on the second band. The wireless node 110-*d* may then forward the second subset of the uplink signals to base station 105-*d* using antennas 305-*f* on the first band. Accordingly, UE 115-*c* may use the other antennas configured to communicate on the second band to transmit the second subset of the uplink signals to the base station 105-*d* (e.g., via the wireless node 110-*d*). That is, the antennas 305-*e* at the UE 115-*d* and the antennas 305-*f* at the wireless node 110-*d* may effectively be joint together, and the effective number of antennas at the UE may be increased (e.g., resulting in 8 transmit antennas and 8 receive antennas in wireless communications system 300-*b*). Communications with a base station on such a joint set of antennas may be referred to as virtual MIMO communications.

Figure 4:
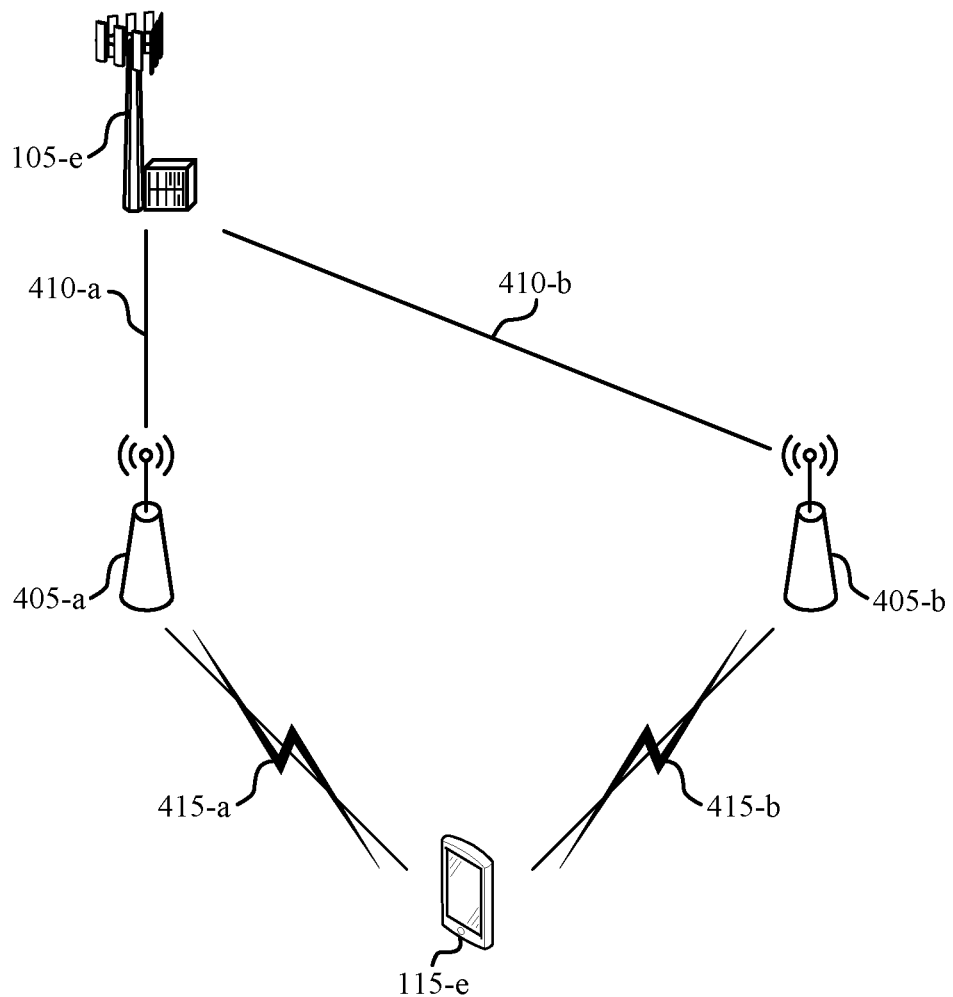
FIG. 4 illustrates an example of traditional CoMP.

As mentioned above, the techniques described herein at a UE 115 for communicating directly with a base station 105 (e.g., via a direct link) and indirectly with the base station 105 (e.g., via a backhaul link with a wireless node) may be referred to as UE CoMP. It is to be understood that UE CoMP is different from traditional CoMP and may be used in addition to, or as an alternative to, traditional CoMP. FIG. 4 illustrates an example of traditional CoMP. In the example of FIG. 4, a base station 105-*e* may be connected with TRP 405-*a* and TRP 405-*b* via wired backhaul links 410-*a* and 410-*b*, respectively. Both TRP 405-*a* and TRP 405-*b* may transmit downlink signals to UE 115-*e* or receive uplink signals from UE 115-*e* via direct links 415-*a* and 415-*b* respectively to improve the quality of service at the UE 115-*e*.

FIGS. 5-8 illustrate examples of UE CoMP in accordance with one or more aspects of the present disclosure. The techniques described with reference to FIGS. 5 and 6 may allow a UE 115-*f* to use additional antennas (e.g., antennas configured to communicate on a mmW band) to communicate with a base station 105-*f* to improve throughput. Alternatively, the techniques described with reference to FIGS. 7 and 8 may allow a UE 115-*g* to use alternative antennas to communicate with a base station 105-*g* to improve throughput (e.g., when the quality of a direct link with base station 105-*g* is poor).

Figure 5:
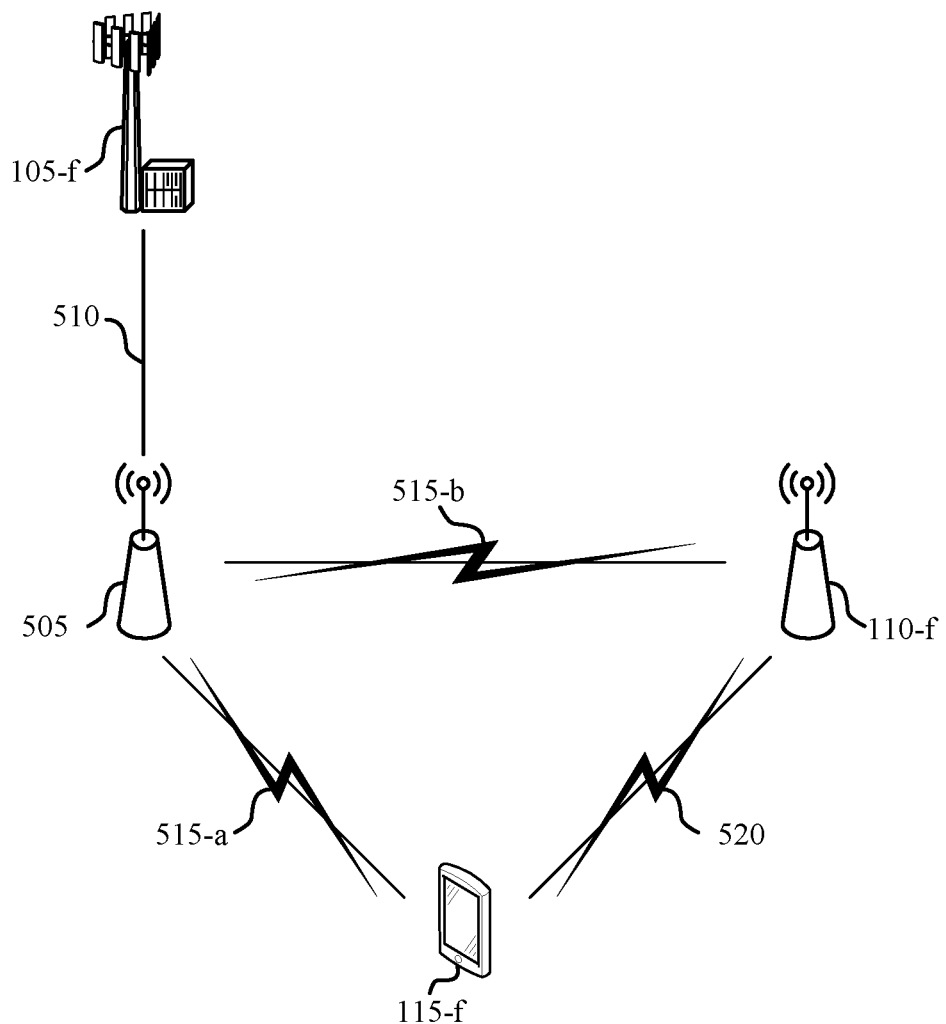
FIGS. 5-8 illustrate examples of UE CoMP in accordance with one or more aspects of the present disclosure.

In the example of FIG. 5, base station 105-*f* may be connected to TRP 505 via a wired backhaul link 510, and UE 115-*f* may communicate with the TRP 505 directly via a direct link 515-*a* (e.g., FR 1) and indirectly via a backhaul link (e.g., 37 GHz, 60 GHz, or FR 2) with wireless node 110-*f* (e.g., a relay, a remote radio head, etc.). For instance, for a downlink transmission, UE 115-*f* may receive a first subset of downlink signals from TRP 505 directly on a first band via direct link 515-*a* and a second subset of downlink signals from wireless node 110-*f* on a second band via backhaul link 520 (e.g., where wireless node 110-*f* monitors the first band via a direct link 515-*b* for downlink signals and forwards the downlink signals to UE 115-*f* via backhaul link 520). Similarly, for an uplink transmission, UE 115-*f* may transmit a first subset of uplink signals to TRP 405-*c* directly on a first band via direct link 515-*a* and a second subset of uplink signals to wireless node 110-*f* on a second band via backhaul link 520 (e.g., where wireless node 110-*f* monitors the second band via backhaul link 520 for uplink signals and forwards the uplink signals to TRP 505 via direct link 515-*b*). In this example, UE 115-*f* and wireless node 110-*f* may communicate with TRP 505 on the same band (e.g., a sub-7 GHz band) via direct link 515-*a* and direct link 515-*b* respectively.

Figure 6:
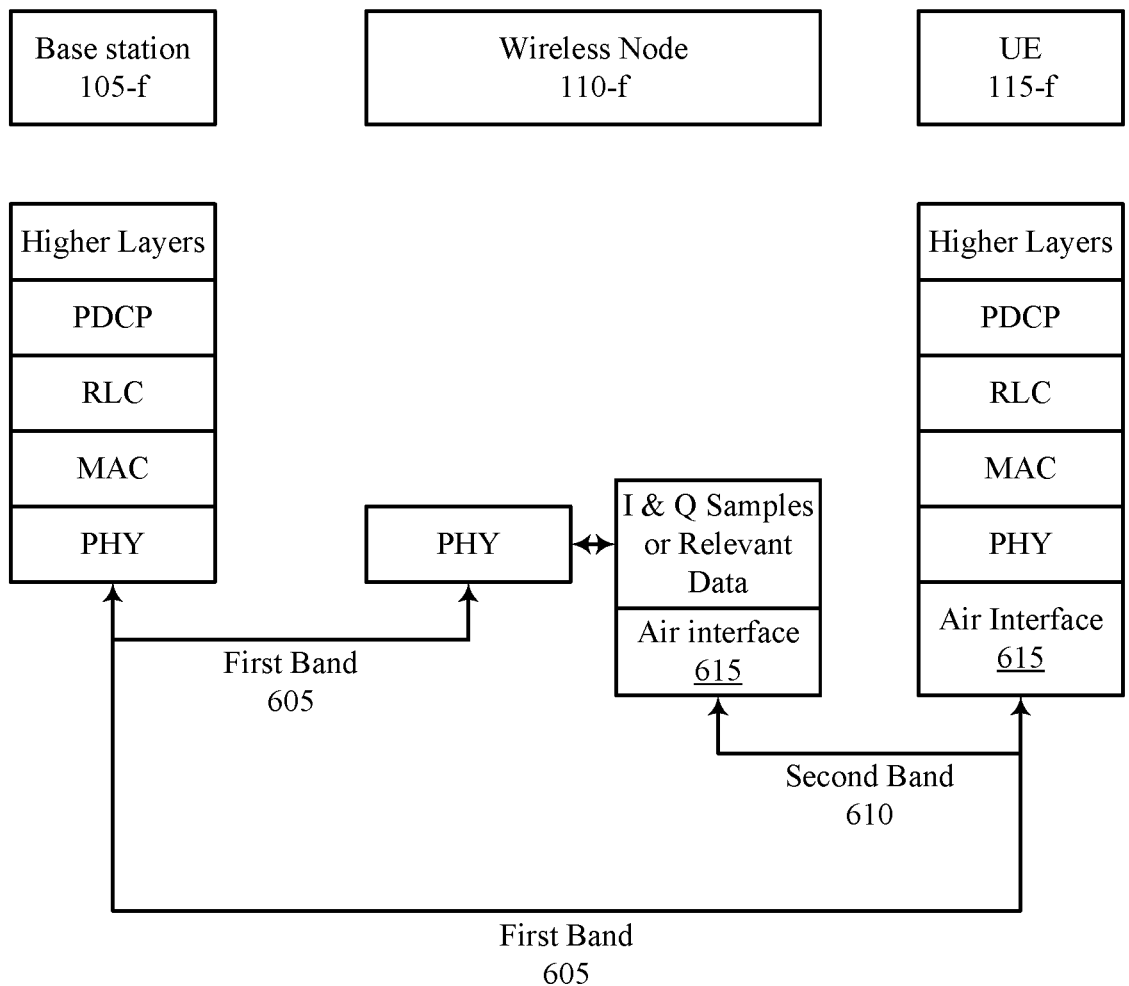

FIG. 6 illustrates an example of direct communications between base station 105-*f* and UE 115-*f* and indirect communications between base station 105-*f* and UE 115-*f* via wireless node 110-*f* (e.g., a layer 1 relay node) in accordance with one or more aspects of the present disclosure. For a downlink transmission, UE 115-*f* may receive a first subset of downlink signals from base station 105-*f* directly on a first band 605 and a second subset of downlink signals from base station 105-*f* indirectly on a second band 610 (e.g., from wireless node 110-*f*). Wireless node 110-*f* may receive PHY layer downlink signals on a first band 605 from base station 105-*f*, and the wireless node 110-*f* may forward at least a subset of the downlink signals on a second band 610 over an air interface 615 to UE 115-*f*. The air interface 615 may be an example of a Wi-Fi air interface or an NR air interface.

In one example, wireless node 110-*f* may generate I & Q samples of the downlink signals and may forward the I & Q samples to UE 115-*f* In another example, wireless node 110-*f* may receive control information from UE 115-*f* on the second band 610 over the air interface 615 to use for processing the downlink signals, and wireless node 110-*f* may process the downlink signals and may forward relevant information (e.g., decoded transport blocks) to UE 115-*f*. For an uplink transmission, UE 115-*f* may transmit a first subset of uplink signals to base station 105-*f* directly on a first band 605 and a second subset of uplink signals to base station 105-*f* indirectly (e.g., through wireless node 110-*f*). For the indirect transmission to base station 105-*f*, UE 115-*f* may transmit PHY layer uplink signals to wireless node 110-$f$ on a second band 610 (e.g., I & Q samples of the uplink signals), and wireless node 110-$f$ may forward the PHY layer uplink signals to base station 105-$f$ on a first band 605.

Figure 7:
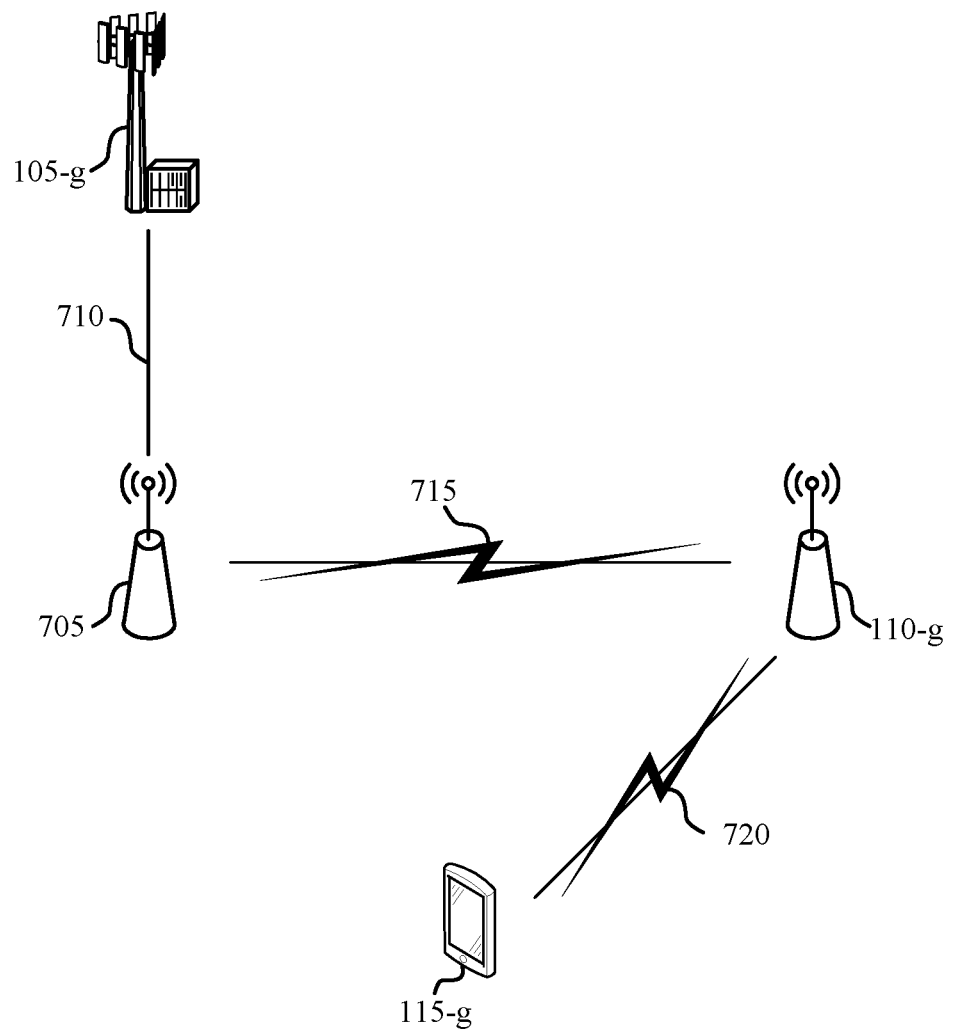

In the example of FIG. 7, base station 105-$g$ may be connected to TRP 705 via a wired backhaul link 710, and UE 115-$g$ may communicate with the TRP 705 indirectly via a backhaul link with wireless node 110-$g$ (e.g., a layer 1 relay node). For instance, instead of receiving downlink signals from TRP 705 directly on a first band via a direct link, UE 115-$g$ may receive all downlink signals from TRP 705 from wireless node 110-$g$ on a second band via backhaul link 720 (e.g., where wireless node 110-$f$ monitors the first band via a direct link 715 for downlink signals and forwards the downlink signals to UE 115-$f$ via backhaul link 720). Similarly, for an uplink transmission, instead of transmitting uplink signals to TRP 705 directly on a first band via a direct link, UE 115-$g$ may transmit all uplink signals to TRP 705 to wireless node 110-$g$ on a second band via backhaul link 720 (e.g., where wireless node 110-$g$ monitors the second band via backhaul link 720 for uplink signals and forwards the uplink signals to TRP 705 via direct link 715). Thus, in some cases, UE 115-$g$ may not communicate with base station 105-$g$ directly and may only communicate with base station 105-$g$ indirectly via wireless node 110-$g$ (e.g., UE 115-$g$ may not have a direct link with base station 105-$g$ or TRP 705, as shown, and UE 115-$g$ may rely completely on the antennas of the wireless node 110-$g$ for communicating with base station 105-$g$ or TRP 705).

Figure 8:
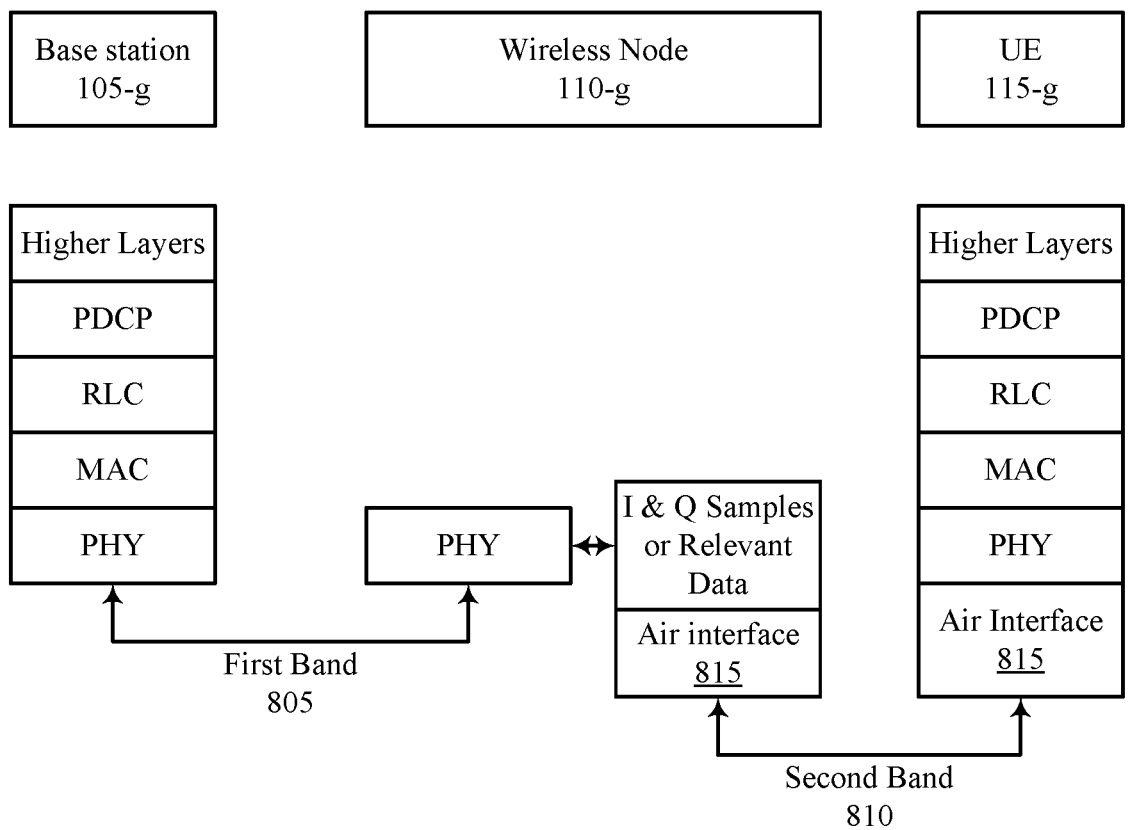

FIG. 8 illustrates an example of the indirect communications between base station 105-$g$ and UE 115-$g$ via wireless node 110-$g$ in accordance with one or more aspects of the present disclosure. For a downlink transmission, wireless node 110-$g$ may receive PHY layer downlink signals on a first band 805 from base station 105-$g$, and the wireless node 110-$g$ may forward at least a subset of the downlink signals (e.g., a subset of the downlink signals or all the downlink signals) on a second band 810 over an air interface 815 to UE 115-$f$. For an uplink transmission, wireless node 110-$g$ may transmit PHY layer uplink signals to wireless node 110-$g$ on a second band 810 (e.g., I & Q samples of the uplink signals) over the air interface 815, and wireless node 110-$g$ may forward the PHY layer uplink signals to base station 105-$g$ on a first band 805. The air interface 815 may be an example of a Wi-Fi air interface or an NR air interface.

Thus, in some cases, as explained above with reference to FIG. 7, UE 115-$g$ may not communicate with base station 105-$g$ directly and may only communicate with base station 105-$g$ indirectly via wireless node 110-$g$ (e.g., UE 115-$g$ may not have a direct link with base station 105-$g$, as shown, and UE 115-$g$ may rely completely on the antennas of the wireless node 110-$g$ for communicating with base station 105-$g$). In one example, wireless node 110-$g$ may generate I & Q samples of the downlink signals and may forward the I & Q samples to UE 115-$g$. In another example, wireless node 110-$g$ may receive control information to use for processing the downlink signals from UE 115-$g$ on the second band 810 over the air interface 815, and wireless node 110-$g$ may process the downlink signals (e.g., perform fast-fourier transform (FFT) and other processing) and may forward relevant information (e.g., decoded transport blocks) to UE 115-$g$. Thus, processing at the UE 115-$g$ may be limited (e.g., since the UE 115-$g$ may receive relevant information from the wireless node 110-$g$, such as decoded transport blocks).

In some cases, to allow wireless node 110-$g$ to process data (e.g., downlink signals) intended for UE 115-$g$, UE 115-$g$ may indicate, or wireless node 110-$g$ may otherwise determine, a cell radio network temporary identifier (C-RNTI) associated with the UE 115-$g$ which the wireless node 110-$g$ may use to process the data. In some examples, UE 115-$g$ may generate physical layer control signaling (e.g., HARQ feedback) after the wireless node 110-$g$ forwards the outcome of the processing or decoding of the associated control and/or data signals. In other examples, the signaling (e.g., HARQ feedback) may be generated by the wireless node 110-$g$. In this example, the wireless node 110-$g$ may generate the HARQ feedback and forward the decoded data to the UE 115-$g$.

It is to be understood that the techniques described above for UE CoMP may be configurable. In one example, a base station 105 may transmit a configuration to a wireless node 110 to indicate whether the wireless node 110 is permitted to forward signals to a UE 115 or to the base station 105 (i.e., whether the wireless node 110 is addressable by the base station 105). If the wireless node 110 is permitted to forward signals to a UE 115 or to a base station 105, the base station 105 may indicate or the wireless node 110 may otherwise determine when the wireless node 110 is allowed to forward signals to a UE 115 or to a base station 105 (e.g., for a particular transmission or for a series of transmissions).

In some cases, a UE 115 may configure the wireless node 110 to forward downlink signals received from a base station 105 to the UE 115 or to forward uplink signals received from the UE 115 to the base station 105. In some examples, the wireless node 110 may be preconfigured to forward downlink signals and uplink signals, and the UE 115 may configure the wireless node to forward downlink signals and uplink signals for that UE (e.g., by connecting to the wireless node). The UE 115 may transmit a configuration message to the wireless node 110 to indicate which downlink signals are to be forwarded by the wireless node 110 to the UE 115. The configuration message may also indicate a format for forwarding downlink signal received from a base station 105 to a UE 115. For instance, UE 115 may indicate in the configuration message whether the wireless node 110 is to forward I & Q samples of downlink signals to UE 115 or whether the wireless node is to decode the downlink signals and transmit the decoded downlink signals (e.g., decoded transport blocks and decoded control information) to UE 115.

In the examples described above, a layer 1 relay node may be used to forward downlink signals to a UE 115 or uplink signals to a base station 105. In other examples, a layer 2 or layer 3 relay may be used to decode downlink signals (e.g., data) and forward the decoded signals (e.g., out of band) to a UE 115 (e.g., via a mmW band). The layer 2 or layer 3 relay may be supported through dual connectivity (e.g., where a UE 115 communicates with different devices on multiple bands) or through a pure relay (e.g., a relay external to the UE 115) with a direct link to a base station 105 on one band (e.g., FR 1) and a relay link to a UE 115 on another band (e.g., FR 2). In such examples, however, the network may associate the layer 2 or layer 3 relay to the UE 115 (e.g., a base station 105 may be involved or may alter procedures to support the layer 2 or layer 3 relay).

Figure 9:
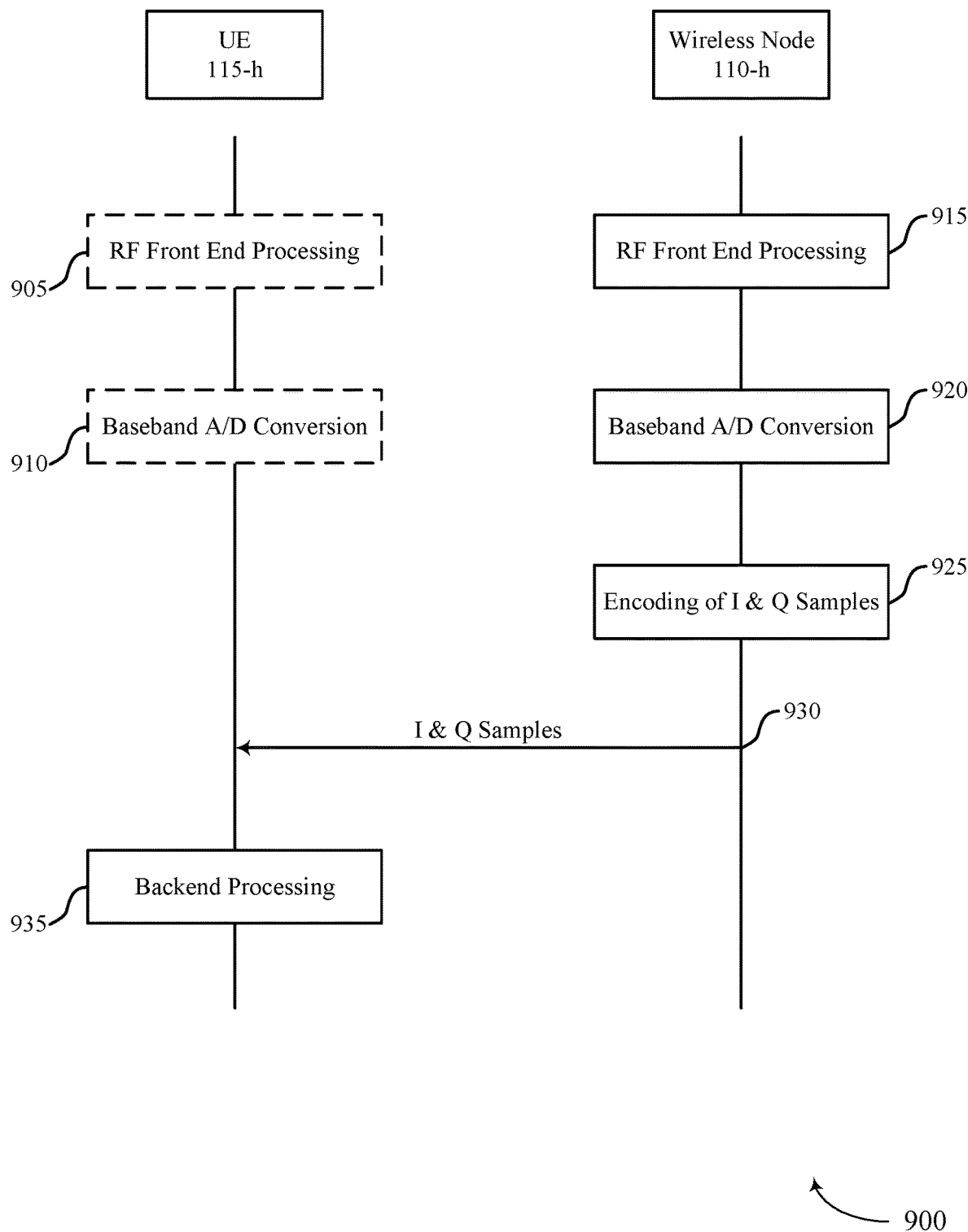
FIGS. 9-11 illustrate examples of process flows that support UE CoMP reception and transmission in accordance with one or more aspects of the present disclosure.

FIG. 9 illustrates an example of a process flow 900 that supports UE CoMP reception and transmission in accordance with one or more aspects of the present disclosure. Process flow 900 illustrates aspects of techniques performed by a UE 115-$h$, which may be an example of a UE 115 described with reference to FIGS. 1-8. Process flow 900 also illustrates aspects of techniques performed by a wireless node 110-$h$, which may be an example of a wireless node described with reference to FIGS. 1-6. In the example of FIG. 9, wireless node 110-*h* may monitor a first band for downlink signals from a base station 105 (not shown), and the wireless node 110-*h* may forward I & Q samples of the downlink signals to UE 115-*h* on a second band.

In some cases, UE 115-*h* may receive a first subset of downlink signals directly from a base station 105 on a first band (e.g., as described with reference to FIG. 5). In such cases, at 905, UE 115-*h* may perform radio frequency (RF) frontend processing on the first subset of downlink signals, and, at 910, UE 115-*h* may perform baseband analog/digital (A/D) conversion on the first subset of downlink signals. The UE 115-*h* may then buffer the first subset of the downlink signals until a second subset of downlink signals (e.g., of a downlink transmission) are received before performing backend processing.

Wireless node 110-*h* may receive a second subset of the downlink signals received on the first band (or all downlink signals if no downlink signals are received by the UE 115-*h* directly from the base station, as described with reference to FIG. 6). At 915, wireless node 110-*h* may then perform RF frontend processing on the second subset of the downlink signals (or on all downlink signals), and, at 920, wireless node 110-*h* may perform baseband A/D conversion on the second subset of the downlink signals. At 925, wireless node 110-*h* may then encode I & Q samples of the downlink signals to forward to UE 115-*h*, and, at 930, wireless node 110-*h* may forward the I & Q samples of the downlink signals to UE 115-*h*.

UE 115-*h* may receive the I & Q samples of the second subset of the downlink signals and may perform backend processing on the buffered, first subset of the downlink signals and the second subset of the downlink signals. Alternatively, if UE 115-*h* does not receive downlink signals directly from the base station 105, UE 115-*h* may perform backend processing on the I & Q samples received from the wireless node 110-*h*. The I & Q samples transmitted to UE 115-*h* may be the raw I & Q samples of the downlink signals or compressed I & Q samples of the downlink signals. In some cases, the maximum date rate requirements of a backhaul link between UE 115-*h* and wireless node 110-*h* without compression may be equal to $$\frac{1}{T_s} * N_{ant} * 2 * N_b$$

(e.g., 2 Gbps for 30 kHz subcarrier spacing, one antenna, and 16 bit quantization), where $T_s$=30*1000*2048 for 30 kHz subcarrier spacing, $N_{ant}$ is the number of antennas, and $N_b$ is the number of bits used to represent quantized I & Q samples (e.g., 16).

Figure 10:
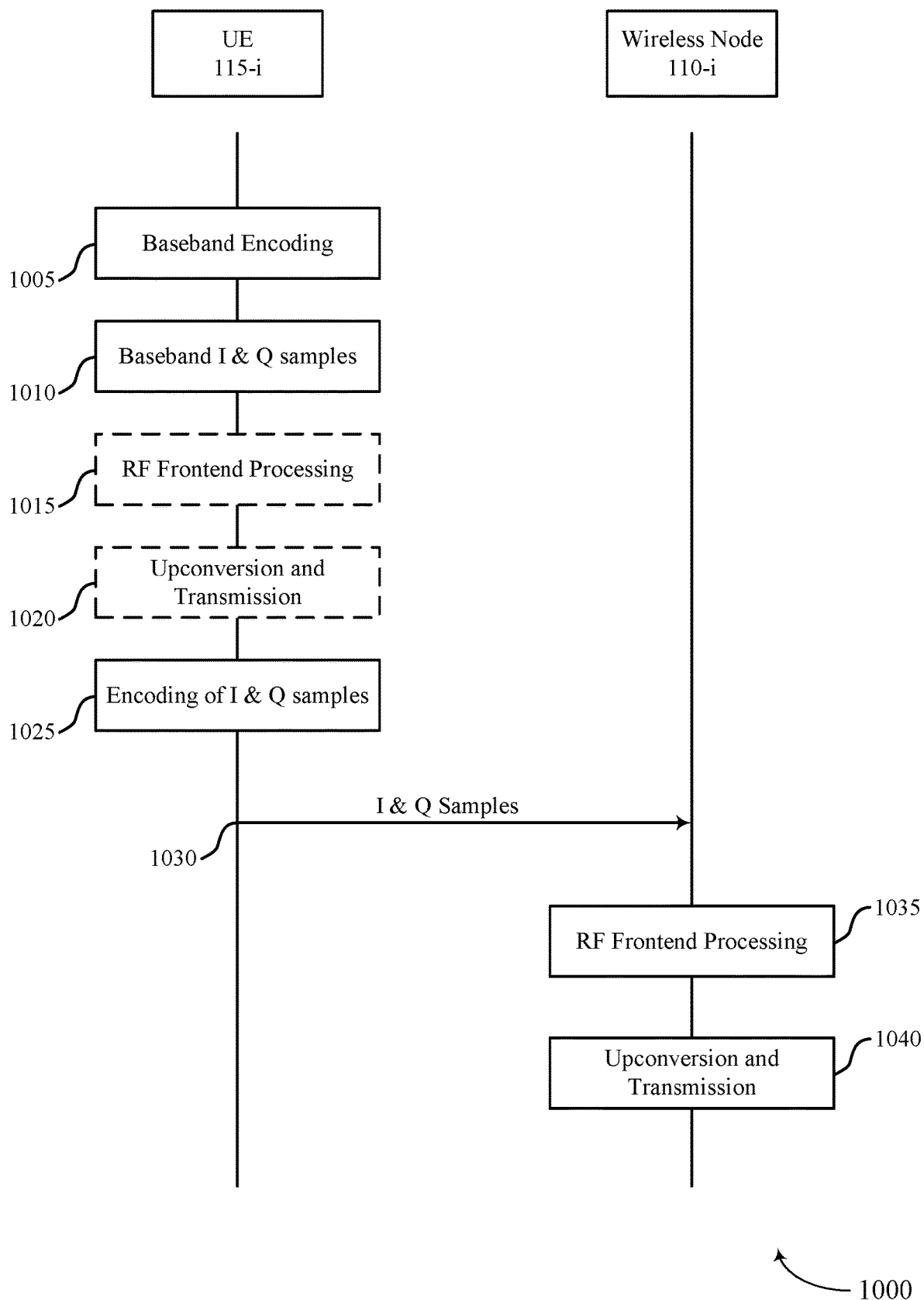

FIG. 10 illustrates an example of a process flow 1000 that supports UE CoMP reception and transmission in accordance with one or more aspects of the present disclosure. Process flow 1000 illustrates aspects of techniques performed by a UE 115-*i*, which may be an example of a UE 115 described with reference to FIGS. 1-7. Process flow 700 also illustrates aspects of techniques performed by a wireless node 110-*i*, which may be an example of a wireless node described with reference to FIGS. 1-7. In the example of FIG. 10, wireless node 110-*g* may monitor a second band for I & Q samples of uplink signals from UE 115-*i*, and the wireless node 110-*i* may forward the uplink signals to a base station 105 (not shown) on a first band.

At 1005, UE 115-*i* may perform baseband encoding on uplink signals to be transmitted to a base station 105, and, at 1010, UE 115-*i* may generate baseband I & Q samples of the uplink signals to be transmitted to the base station 105. In some cases, UE 115-*i* may transmit a first subset of uplink signals directly to a base station 105 on a first band (e.g., as described with reference to FIG. 5). In such cases, at 1015, UE 115-*i* may perform RF frontend processing on the first subset of the uplink signals, and, at 1020, UE 115-*i* may perform upconversion and may transmit the first subset of the uplink signals directly to the base station 105.

At 1025, UE 115-*i* may then encode I & Q samples of the second subset of the uplink signals (or all the uplink signals if no uplink signals are transmitted directly to the base station, as described with reference to FIG. 6), and, at 1030, UE 115-*i* may transmit the I & Q samples to wireless node 110-*i* on the second band to be forwarded to the base station 105 on the first band. The I & Q samples transmitted to wireless node 110-*i* may be the raw I & Q samples of the downlink signals or compressed I & Q samples of the uplink signals. In some cases, the maximum date rate requirements of a backhaul link between UE 115-*i* and wireless node 110-*i* without compression may be equal to $$\frac{1}{T_s} * N_{ant} * 2 * N_b$$

(e.g., 2 Gbps for 30 kHz subcarrier spacing, one antenna, and 16 bit quantization), where $T_s$=30*1000*2048 for 30 kHz subcarrier spacing, $N_{ant}$ is the number of antennas, and $N_b$ is the number of bits used to represent quantized I & Q samples (e.g., 16). At 1035, wireless node 110-*i* may perform RF frontend processing on the I & Q samples, and, at 1040, wireless node 110-*a* may perform upconversion on the I & Q samples and may transmit the uplink signals to the base station 105 on the first band.

Figure 11:
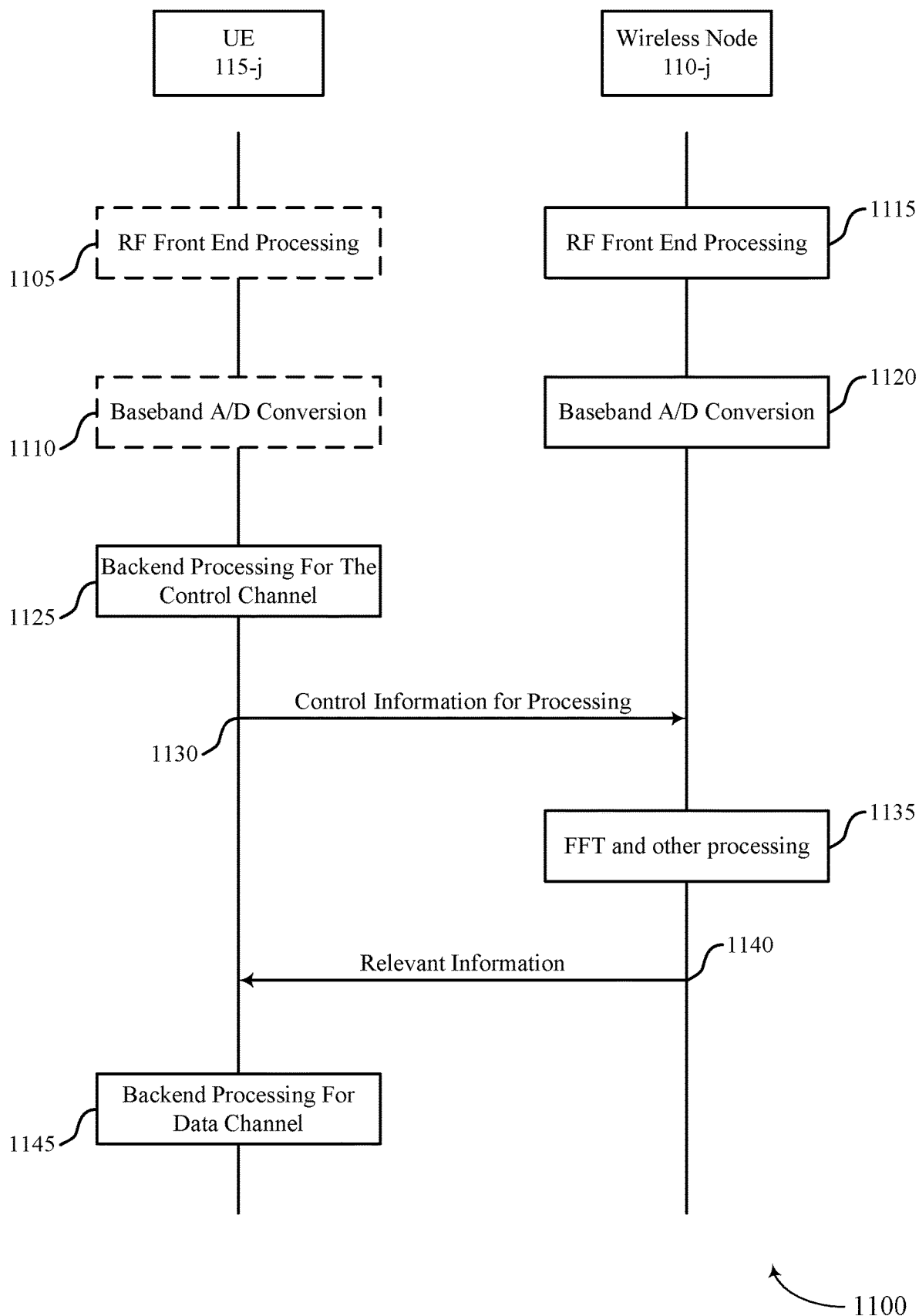

FIG. 11 illustrates an example of a process flow 1100 that supports UE CoMP reception and transmission in accordance with one or more aspects of the present disclosure. Process flow 1100 illustrates aspects of techniques performed by a UE 115-*j*, which may be an example of a UE 115 described with reference to FIGS. 1-8. Process flow 1100 also illustrates aspects of techniques performed by a wireless node 110-*j*, which may be an example of a wireless node described with reference to FIGS. 1-8. In the example of FIG. 11, wireless node 110-*j* may monitor a first band for downlink signals from a base station 105 (not shown), and the wireless node 110-*j* may process the downlink signals and forward the processed signals to UE 115-*j* on a second band (i.e., processing may be distributed).

In some cases, UE 115-*j* may receive a first subset of downlink signals directly from a base station 105 on a first band (e.g., as described with reference to FIG. 5). In such cases, at 1105, UE 115-*j* may perform RF frontend processing on the first subset of downlink signals, and, at 1110, UE 115-*j* may perform baseband A/D conversion on the first subset of downlink signals. The UE 115-*j* may then buffer the first subset of the downlink signals until a second subset of downlink signals (e.g., of a downlink transmission) are received before performing backend processing.

Wireless node 110-*j* may receive a second subset of the downlink signals received on the first band (or all downlink signals if no downlink signals are received by the UE 115-*j* directly from the base station, as described with reference to FIG. 6). At 1115, wireless node 110-*j* may then perform RF frontend processing on the second subset of the downlink signals (or on all downlink signals), and, at 1120, wireless node 110-*j* may perform baseband A/D conversion on the second subset of the downlink signals (or on all downlink signals). At 1125, UE 115-*j* may perform backend processing for the control channel received from a base station 105, and, at 1130, UE 115-*j* may transmit control information to be used by wireless node 110-*j* to perform FFT and other processing on the second subset of downlink signals.

At 1125, wireless node 110-*j* may then perform FFT and other processing (e.g., decoding data or transport blocks) on the second subset of the downlink signals (or on all downlink signals), and, at 1140, wireless node 110-*j* may encode and transmit the relevant information to UE 115-*j* (e.g., decoded transport blocks). Thus, UE 115-*j* may be associated with wireless node 110-*j*, and wireless node 110-*j* may serve as a proxy for decoding downlink data received on a direct link from a base station 105 and for transmitting uplink data on the direct link to the base station 105 (e.g., where the second band used for communications between UE 115-*j* and wireless node 110-*j* may be a sub-7 GHz node or a mmW band). At 1145, UE 115-*j* may then perform backend processing for a data channel (e.g., on the first subset of downlink signals received directly from a base station 105 and on the second subset of downlink signals received from wireless node 110-*j*).

As discussed above, the techniques described herein for UE CoMP may increase throughput in a wireless communications system by allowing a UE 115 to utilize additional antennas for communicating with a base station 105. Further, these techniques may help to prevent a bottleneck effect at a direct communication link between a UE 115 and a base station 105 due to the limited number of antennas at the UE 115 (e.g., due to the physical limitation of the device). In some cases, the use of UE CoMP may result in an increase in latency for communications between a UE 115 and base station 105 (e.g., due to signals being routed through a wireless node). In such cases, the UE 115 may communicate with the base station 105 to determine updated HARQ timing for providing HARQ feedback to the base station 105 (e.g., for downlink signals) or receiving HARQ feedback from the base station 105 (e.g., for uplink signals).

Thus, communications between a base station 105 and a UE 115 may operate based on a flexible timeline and constraints in a wireless communications system may be adjusted based on the flexible timeline. If, however, the additional latency does not cause a delay that exceeds delay requirements of a direct link, the UE 115 may not have to change HARQ timing (e.g., may not have to communicate with a base station 105 to support the techniques for UE CoMP). In some examples, additional techniques for power control optimization may be introduced to limit power consumption at a UE 115 supporting techniques for UE CoMP. Further, additional wireless nodes (e.g., relays, remote radio heads, etc.) may be deployed in a wireless communications system (e.g., in a relay network or embedded in a cellular network) to support techniques for UE CoMP. (e.g., by consumers without operator involvement in order to improve local coverage).

In addition, the techniques described herein may be suitable for industrial applications where neighboring devices can share antennas (e.g., where neighboring UEs 115 may communicate over a mobile backhaul link with each other and over direct links with a base station 105). The direct link may be a fixed wireless link with massive MIMO, and the mobile backhaul link may support high mobility. In some cases, a control plane may be introduced for communications between a UE and a wireless node (e.g., to allow for association control and radio resource management (RRM)) over a mobile backhaul link or air interface (e.g., based on NR, NR-U, Wi-Fi, etc.). Further, similar techniques as those used to support direct links between a UE 115 and a base station 105 may be implemented to support mobile backhaul links (e.g., similar techniques for re-establishing a connection after radio link failure (RLF)).

Figure 12:
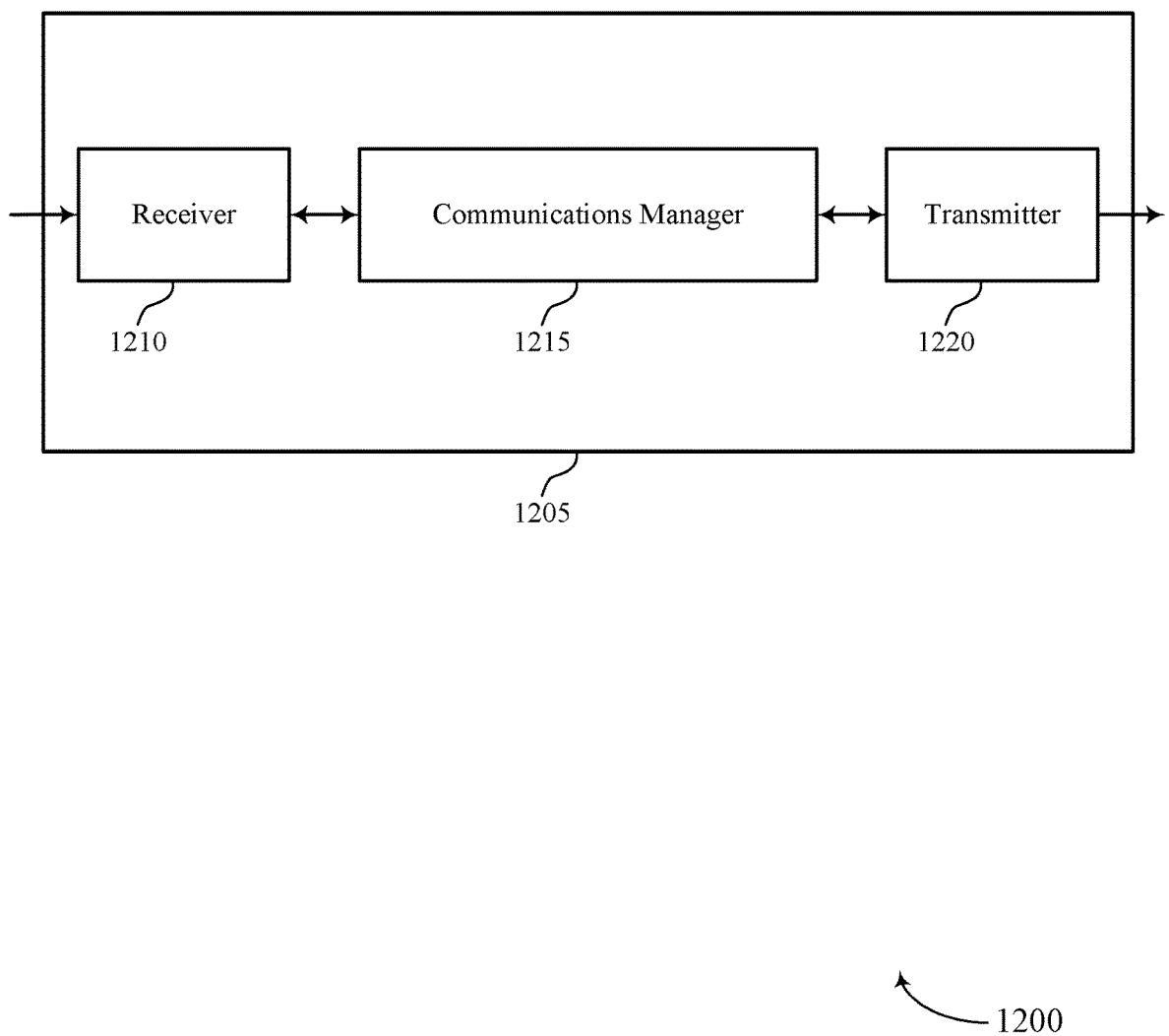
FIGS. 12 and 13 show block diagrams of devices that support UE CoMP reception and transmission in accordance with one or more aspects of the present disclosure.

FIG. 12 shows a block diagram 1200 of a device 1205 that supports UE CoMP reception and transmission in accordance with one or more aspects of the present disclosure. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to UE CoMP reception and transmission, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a first band to communicate with a base station and a second band to communicate with a wireless node, configure the wireless node to forward one or more downlink signals, received from the base station on the first band, to the UE on the second band or to forward one or more uplink signals, received from the UE on the second band, to the base station on the first band, and communicate with the base station on the first band and the wireless node on the second band based on the configuring. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 1215 as described herein may be implemented to realize one or more potential advantages. One implementation may allow a UE to efficiently utilize available antennas for communication with a base station. In particular, the UE may use antennas configured for communications on a first band in addition to antennas configured for communications on a second band to communicate with a base station, resulting in increased throughput. Further, even though the UE may rely on a wireless node to forward one or more uplink signals to a base station or one or more downlink signals from the base station, because the wireless node may receive the one or more downlink signals from the base station or transmit the one or more uplink signals to the base station on the same band (e.g., first band) as the UE, the base station may not have to adjust operations. In some cases, however, the wireless node may receive the one or more downlink signals from the base station or transmit the one or more uplink signals to the base station on a different band (e.g., different from the band used for communications between the base station and the UE).

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
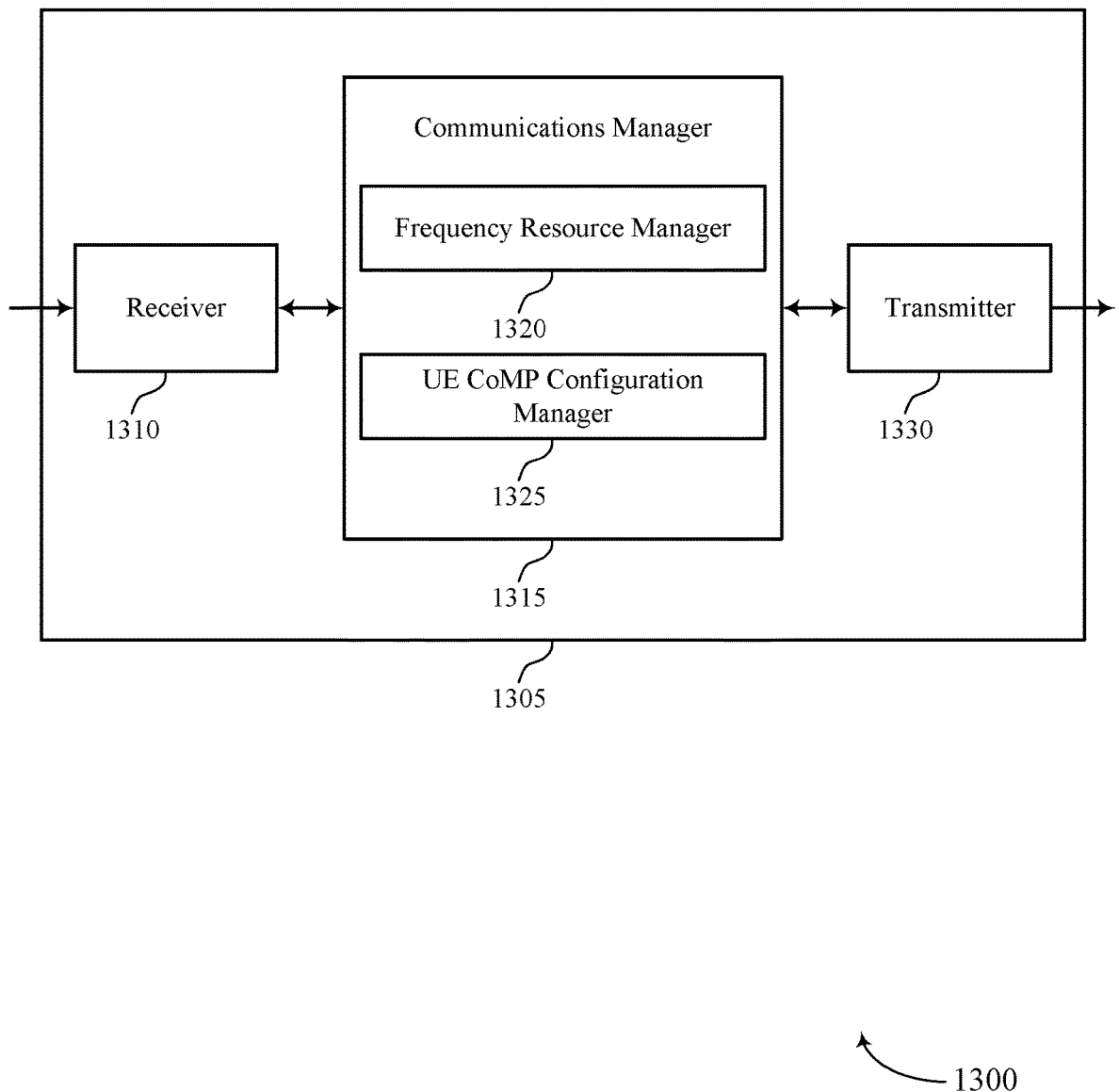

FIG. 13 shows a block diagram 1300 of a device 1305 that supports UE CoMP reception and transmission in accordance with one or more aspects of the present disclosure. The device 1305 may be an example of aspects of a device 1205, or a UE 115 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to UE CoMP reception and transmission, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a frequency resource manager 1320 and a UE CoMP configuration manager 1325. The communications manager 1315 may be an example of aspects of the communications manager 1510 described herein.

The frequency resource manager 1320 may identify a first band to communicate with a base station and a second band to communicate with a wireless node. The UE CoMP configuration manager 1325 may configure the wireless node to forward one or more downlink signals, received from the base station on the first band, to the UE on the second band or to forward one or more uplink signals, received from the UE on the second band, to the base station on the first band. The communications manager 1315 may then communicate with the base station on the first band and the wireless node on the second band based on the configuring.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
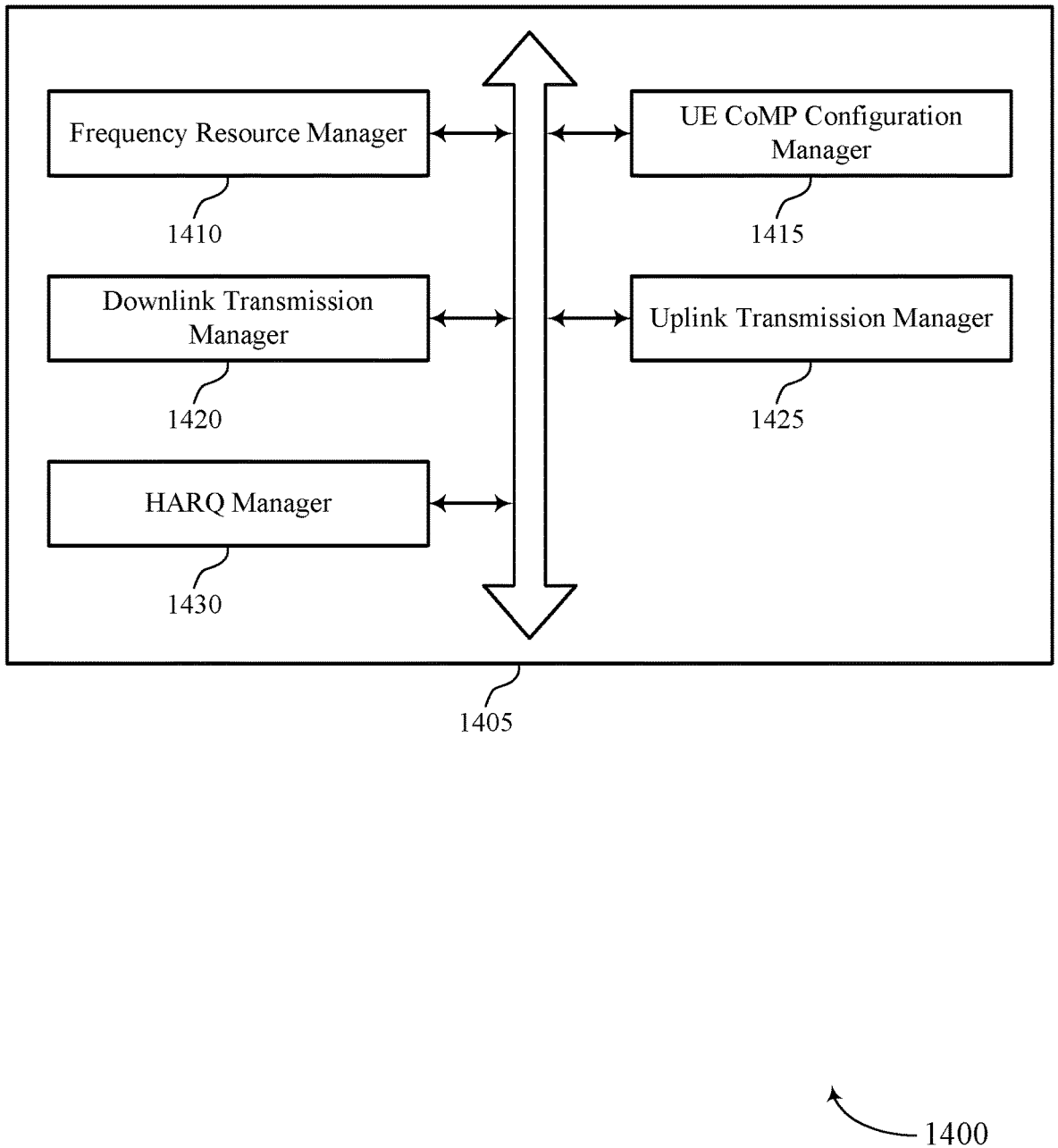
FIG. 14 shows a block diagram of a communications manager that supports UE CoMP reception and transmission in accordance with one or more aspects of the present disclosure.

FIG. 14 shows a block diagram 1400 of a communications manager 1405 that supports UE CoMP reception and transmission in accordance with one or more aspects of the present disclosure. The communications manager 1405 may be an example of aspects of a communications manager 1215, a communications manager 1315, or a communications manager 1510 described herein. The communications manager 1405 may include a frequency resource manager 1410, a UE CoMP configuration manager 1415, a downlink transmission manager 1420, an uplink transmission manager 1425, and a HARQ manager 1430. Each of these modules may communicate, directly or indirectly, with one another (e.g., via one or more buses).

The frequency resource manager 1410 may identify a first band to communicate with a base station and a second band to communicate with a wireless node. The UE CoMP configuration manager 1415 may configure the wireless node to forward one or more downlink signals, received from the base station on the first band, to the UE on the second band or to forward one or more uplink signals, received from the UE on the second band, to the base station on the first band. The communications manager 1405 may then communicate with the base station on the first band and the wireless node on the second band based on the configuring.

In some examples, the UE CoMP configuration manager 1415 may transmit, from the UE, a configuration message to the wireless node indicating that the wireless node is to forward the one or more downlink signals to the UE and forward the one or more uplink signals to the base station. In some cases, communicating with the base station on the first band and the wireless node on the second band includes communicating directly with the base station on the first band and communicating indirectly with the base station via the wireless node on the second band using virtual MIMO. In some cases, the wireless node is a remote radio head for the UE.

In some examples, the UE CoMP configuration manager 1415 may configure the wireless node to forward the at least the subset of the one or more downlink signals scheduled to be transmitted to the UE from the base station. In some examples, the UE CoMP configuration manager 1415 may configure the wireless node to forward the at least the subset of the one or more uplink signals transmitted to the wireless node on the second band to the base station on the first band. In some examples, the UE CoMP configuration manager 1415 may configure a format for forwarding the one or more downlink signals or the one or more uplink signals.

In some cases, the one or more downlink signals or the one or more uplink signals are forwarded in the form of raw or compressed I & Q samples of the one or more downlink signals or the one or more uplink signals. In some cases, the one or more downlink signals are forwarded in the form of decoded transport blocks, decoded control information, or both. In some cases, the UE is configured to communicate with the base station on the first band using a first set of antennas, and the UE is configured to communicate with the wireless node on the second band using a second, additional set of antennas.

The downlink transmission manager 1420 may determine that the one or more downlink signals are scheduled to be transmitted to the UE from the base station on the first band. In some examples, the downlink transmission manager 1420 may receive, from the wireless node on the second band, at least a subset of the one or more downlink signals scheduled to be transmitted to the UE from the base station. In some examples, the downlink transmission manager 1420 may receive, from the wireless node on the second band, all of the one or more downlink signals scheduled to be transmitted to the UE from the base station. In some examples, the downlink transmission manager 1420 may receive, from the base station on the first band, a first subset of the one or more downlink signals scheduled to be transmitted to the UE from the base station. In some examples, the downlink transmission manager 1420 may receive, from the wireless node on the second band, a second subset of the one or more downlink signals scheduled to be transmitted to the UE from the base station.

The uplink transmission manager 1425 may identify the one or more uplink signals to be transmitted to the base station. In some examples, the uplink transmission manager 1425 may transmit at least a subset of the one or more uplink signals to the wireless node on the second band, where the at least the subset of the one or more uplink signals is to be forwarded by the wireless node to the base station on the first band. In some examples, the uplink transmission manager 1425 may transmit all of the one or more uplink signals to the wireless node on the second band, where all of the one or more uplink signals are to be forwarded by the wireless node to the base station on the first band. In some examples, the uplink transmission manager 1425 may transmit a first subset of the one or more uplink signals to the base station on the first band. In some examples, the uplink transmission manager 1425 may transmit a second subset of the one or more uplink signals to the wireless node on the second band, where the second subset of the one or more uplink signals is to be forwarded by the wireless node to the base station on the first band. The HARQ manager 1430 may communicate with the base station to determine an updated HARQ timeline for providing HARQ feedback to the base station for the one or more downlink signals.

Figure 15:
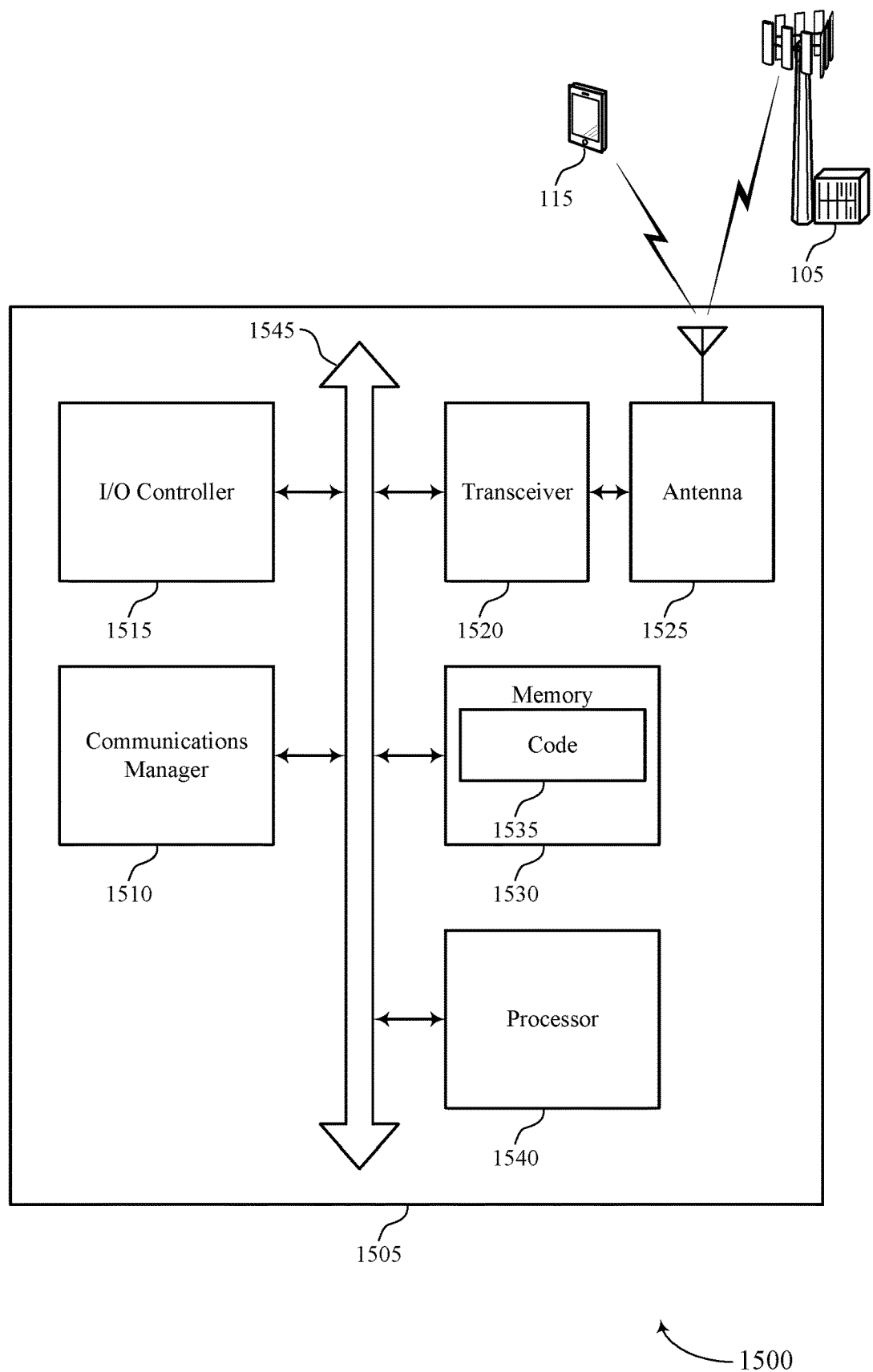
FIG. 15 shows a diagram of a system including a device that supports UE CoMP reception and transmission in accordance with one or more aspects of the present disclosure.

FIG. 15 shows a diagram of a system 1500 including a device 1505 that supports UE CoMP reception and transmission in accordance with one or more aspects of the present disclosure. The device 1505 may be an example of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may identify a first band to communicate with a base station and a second band to communicate with a wireless node, configure the wireless node to forward one or more downlink signals, received from the base station on the first band, to the UE on the second band or to forward one or more uplink signals, received from the UE on the second band, to the base station on the first band, and communicate with the base station on the first band and the wireless node on the second band based on the configuring.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code 1535 including instructions that, when executed, cause the processor to perform various functions described herein. In some cases, the memory 1530 may contain, among other things, a basic input/output system (BIOS) which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting UE CoMP reception and transmission).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
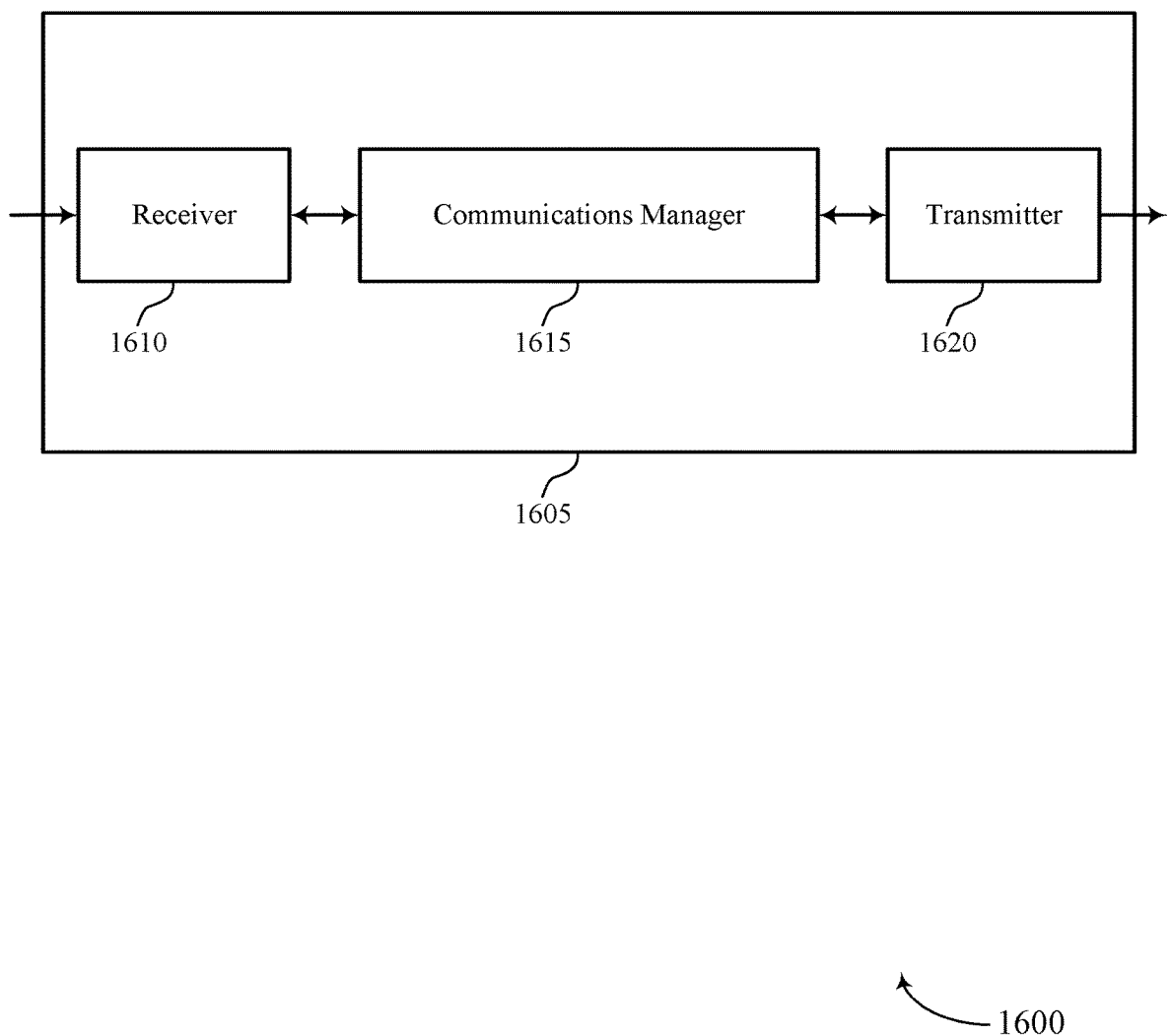
FIGS. 16 and 17 show block diagrams of devices that support UE CoMP reception and transmission in accordance with one or more aspects of the present disclosure.

FIG. 16 shows a block diagram 1600 of a device 1605 that supports UE CoMP reception and transmission in accordance with one or more aspects of the present disclosure. The device 1605 may be an example of aspects of a wireless node 110 as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to UE CoMP reception and transmission, etc.). Information may be passed on to other components of the device 1605. The receiver 1610 may be an example of aspects of the transceiver 1925 described with reference to FIG. 19. The receiver 1610 may utilize a single antenna or a set of antennas.

The communications manager 1615 may identify a first band to be used for communications between a UE and a base station and a second band to be used for communications between the wireless node and the UE, receive, from the UE, a configuration for forwarding one or more downlink signals, received from the base station on the first band, to the UE on the second band or for forwarding one or more uplink signals, received from the UE on the second band, to the base station on the first band, and communicate with the base station on the first band and the UE on the second band based on the configuration. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1925 described with reference to FIG. 19. The transmitter 1620 may utilize a single antenna or a set of antennas.

Figure 17:
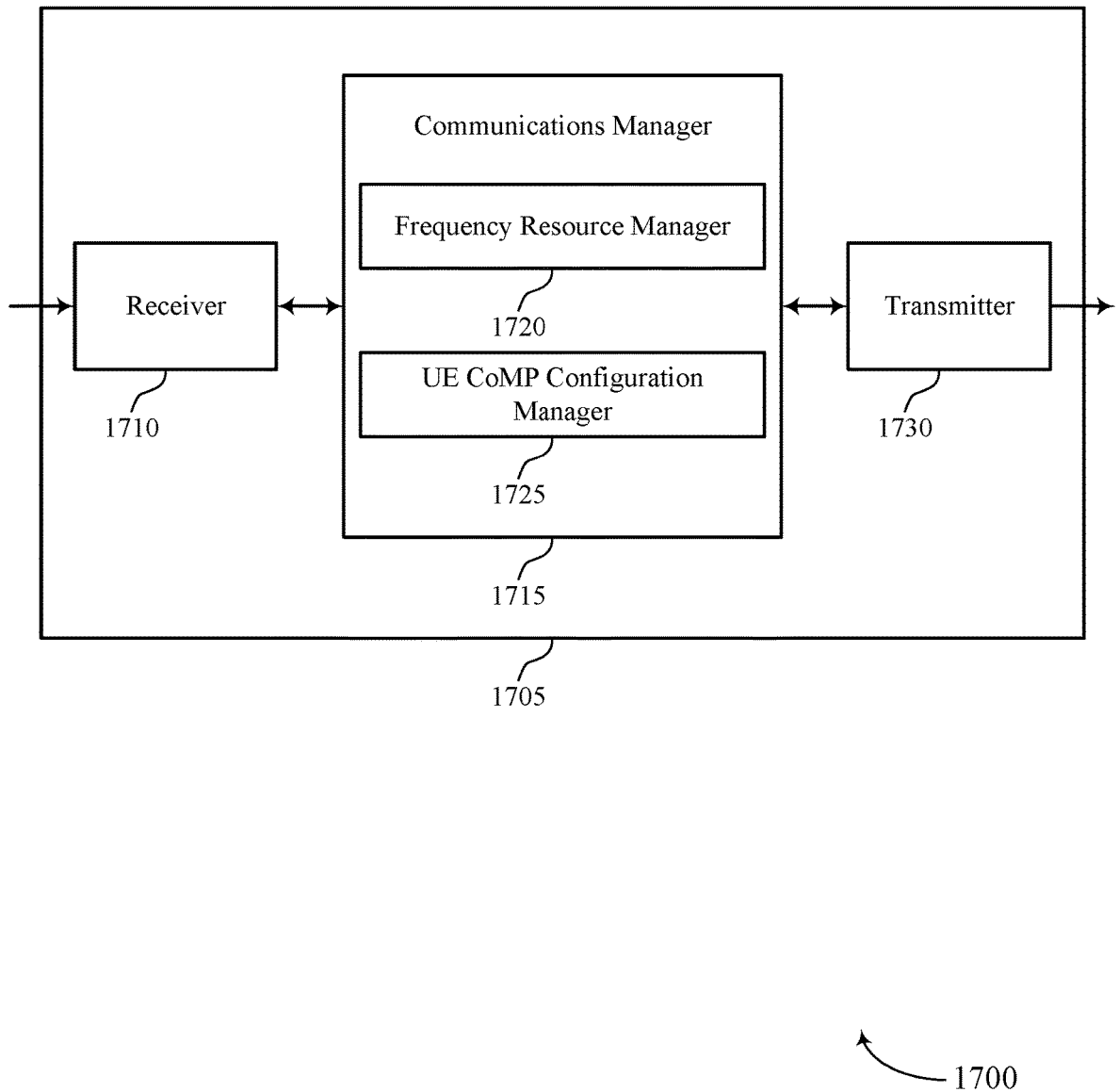

FIG. 17 shows a block diagram 1700 of a device 1705 that supports UE CoMP reception and transmission in accordance with one or more aspects of the present disclosure. The device 1705 may be an example of aspects of a device 1605, or a wireless node 110 as described herein. The device 1705 may include a receiver 1710, a communications manager 1715, and a transmitter 1730. The device 1705 may also include a processor. Each of these components may be in communication with one another (e.g., via one or more buses).

The receiver 1710 may receive information such as packets, user data, or control information associated with various information channels (e.g., control channels, data channels, and information related to UE CoMP reception and transmission, etc.). Information may be passed on to other components of the device 1705. The receiver 1710 may be an example of aspects of the transceiver 1925 described with reference to FIG. 19. The receiver 1710 may utilize a single antenna or a set of antennas.

The communications manager 1715 may be an example of aspects of the communications manager 1615 as described herein. The communications manager 1715 may include a frequency resource manager 1720 and a UE CoMP configuration manager 1725. The communications manager 1715 may be an example of aspects of the communications manager 1910 described herein.

The frequency resource manager 1720 may identify a first band to be used for communications between a UE and a base station and a second band to be used for communications between the wireless node and the UE. The UE CoMP configuration manager 1725 may receive, from the UE, a configuration for forwarding one or more downlink signals, received from the base station on the first band, to the UE on the second band or for forwarding one or more uplink signals, received from the UE on the second band, to the base station on the first band. The communications manager 1715 may then communicate with the base station on the first band and the UE on the second band based on the configuration.

The transmitter 1730 may transmit signals generated by other components of the device 1705. In some examples, the transmitter 1730 may be collocated with a receiver 1710 in a transceiver module. For example, the transmitter 1730 may be an example of aspects of the transceiver 1925 described with reference to FIG. 19. The transmitter 1730 may utilize a single antenna or a set of antennas.

Figure 18:
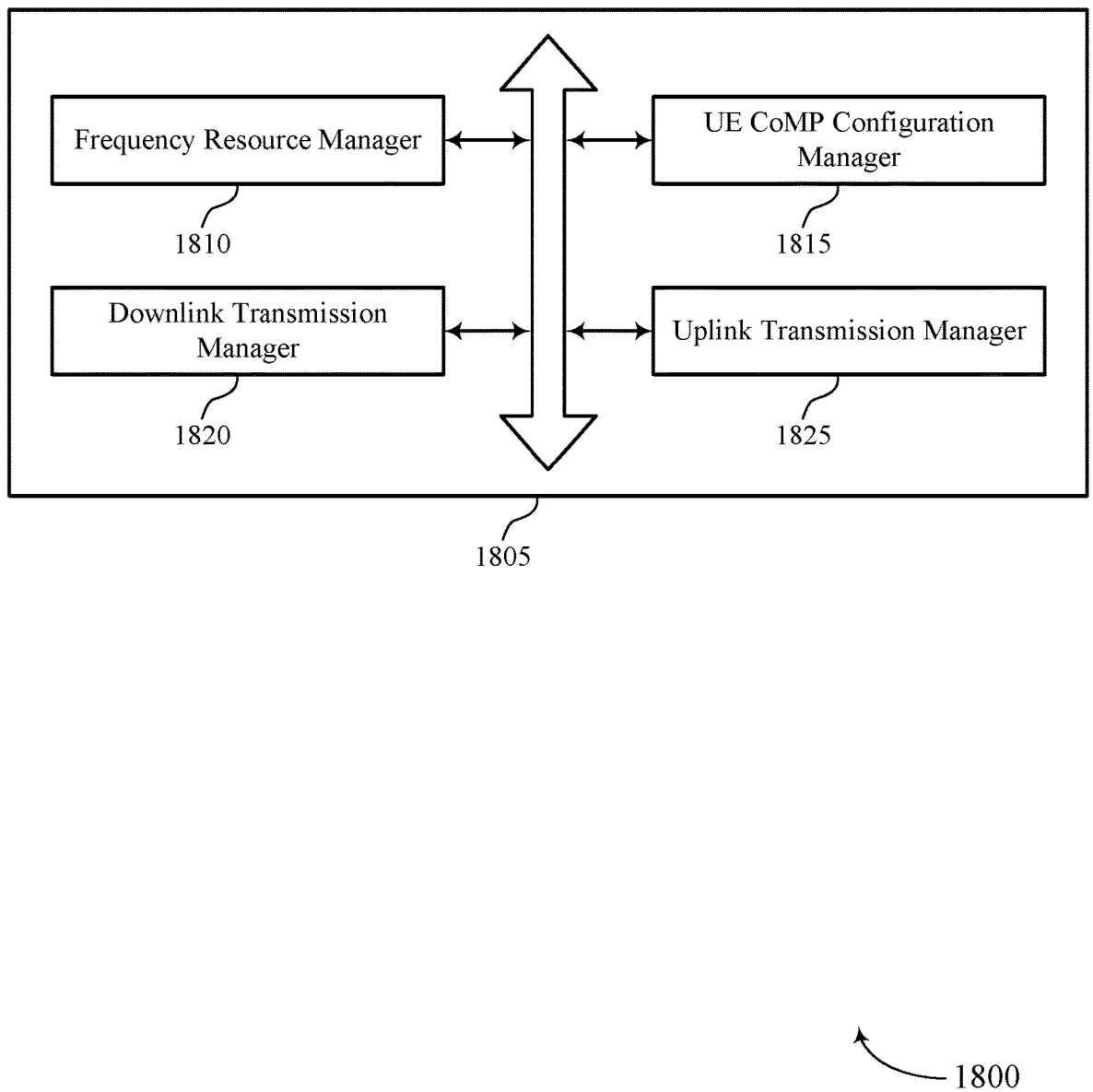
FIG. 18 shows a block diagram of a communications manager that supports UE CoMP reception and transmission in accordance with one or more aspects of the present disclosure.

FIG. 18 shows a block diagram 1800 of a communications manager 1805 that supports UE CoMP reception and transmission in accordance with one or more aspects of the present disclosure. The communications manager 1805 may be an example of aspects of a communications manager 1615, a communications manager 1715, or a communications manager 1910 described herein. The communications manager 1805 may include a frequency resource manager 1810, a UE CoMP configuration manager 1815, a downlink transmission manager 1820, and an uplink transmission manager 1825. Each of these modules may communicate, directly or indirectly, with one another (e.g., via one or more buses).

The frequency resource manager 1810 may identify a first band to be used for communications between a UE and a base station and a second band to be used for communications between the wireless node and the UE. The UE CoMP configuration manager 1815 may receive, from the UE, a configuration for forwarding one or more downlink signals, received from the base station on the first band, to the UE on the second band or for forwarding one or more uplink signals, received from the UE on the second band, to the base station on the first band. The communications manager 1805 may then communicate with the base station on the first band and the UE on the second band based on the configuration.

In some cases, communicating with the base station on the first band and the UE on the second band includes forwarding the one or more downlink signals from the base station to the UE and the one or more uplink signals from the UE to the base station to facilitate indirect communications between the UE and the base station using virtual MIMO. In some cases, the wireless node is a remote radio head for the UE.

In some cases, the configuration for forwarding the one or more downlink signals or the one or more uplink signals, received from the UE, indicates a format for forwarding the one or more downlink signals or the one or more uplink signals. In some cases, the one or more downlink signals or the one or more uplink signals are forwarded in the form of raw or compressed I & Q samples of the one or more downlink signals or the one or more uplink signals based on the configuration. In some cases, the one or more downlink signals are forwarded in the form of decoded transport blocks, decoded control information, or both based on the configuration. In some cases, the configuration for forwarding the one or more downlink signals or the one or more uplink signals is received from the UE or the base station.

The downlink transmission manager 1820 may monitor the first band for the one or more downlink signals scheduled to be transmitted by the base station to the UE on the first band. In some examples, the downlink transmission manager 1820 may receive the one or more downlink signals on the first band. In some examples, the downlink transmission manager 1820 may transmit, to the UE on the second band, at least a subset of the one or more downlink signals received on the first band. In some examples, the downlink transmission manager 1820 may transmit, to the UE on the second band, all of the one or more downlink signals received on the first band. In some examples, the downlink transmission manager 1820 may transmit, to the UE on the second band, a second subset of the one or more downlink signals received on the first band. In some cases, the configuration for forwarding the one or more downlink signals or the one or more uplink signals, received from the UE, indicates that the wireless node is to forward the at least the subset of the one or more downlink signals to the UE.

The uplink transmission manager 1825 may monitor the second band for the one or more uplink signals from the UE to be forwarded to the base station on the first band. In some examples, the uplink transmission manager 1825 may receive the one or more uplink signals on the second band. In some examples, the uplink transmission manager 1825 may transmit the one or more uplink signals received on the second band to the base station on the first band.

Figure 19:
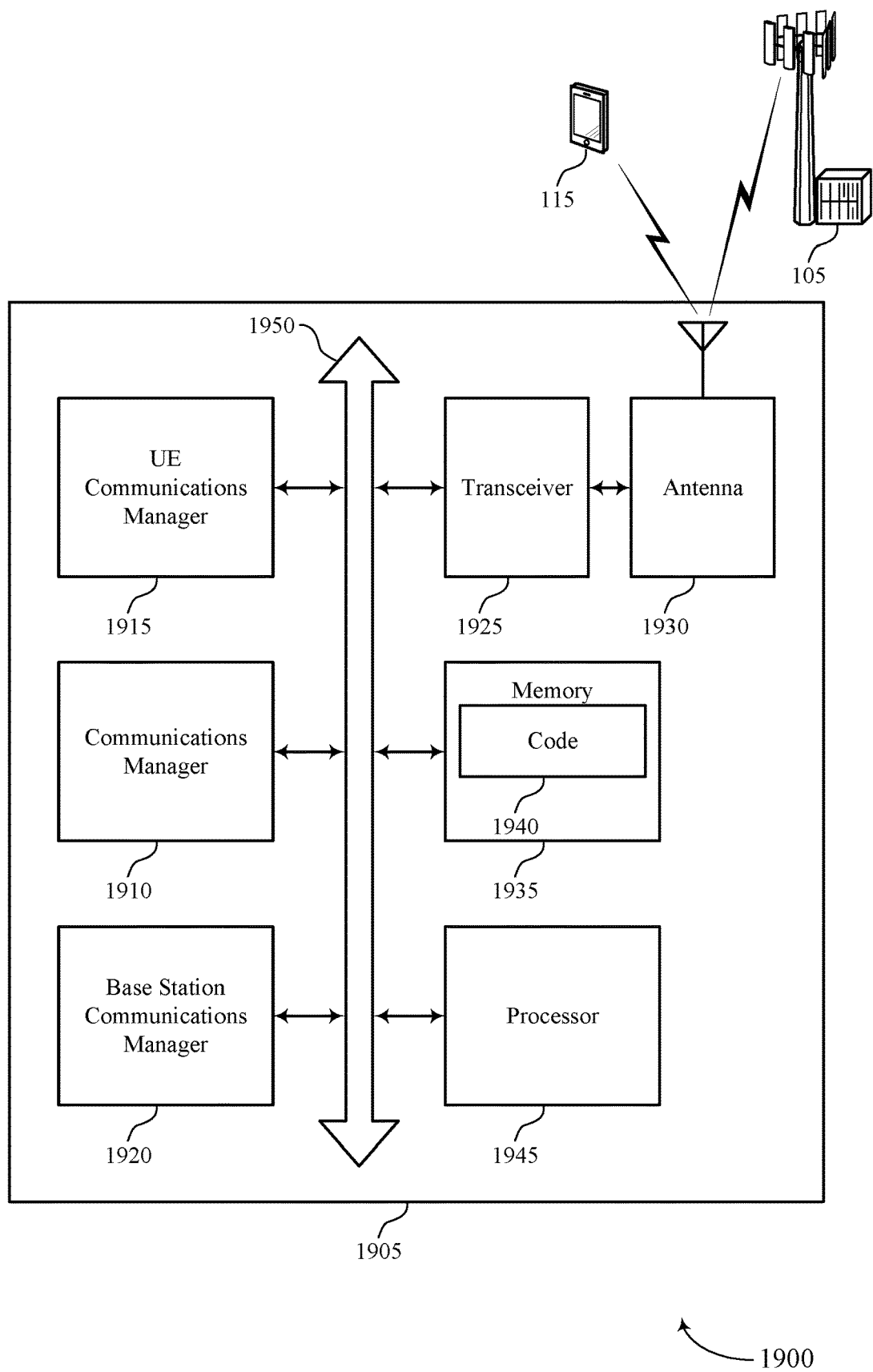
FIG. 19 shows a diagram of a system including a device that supports UE CoMP reception and transmission in accordance with one or more aspects of the present disclosure.

FIG. 19 shows a diagram of a system 1900 including a device 1905 that supports UE CoMP reception and transmission in accordance with one or more aspects of the present disclosure. The device 1905 may be an example of or include the components of device 1605, device 1705, or a wireless node 110 as described herein. The device 1905 may include components for bi-directional voice and data communications including components for transmitting and receiving communications, including a communications manager 1910, a UE communications manager 1915, a base station communications manager 1920, a transceiver 1925, an antenna 1930, memory 1935, and a processor 1945. These components may be in electronic communication via one or more buses (e.g., bus 1950).

The communications manager 1910 may identify a first band to be used for communications between a UE and a base station and a second band to be used for communications between the wireless node and the UE, receive a configuration for forwarding one or more downlink signals, received from the base station on the first band, to the UE on the second band or for forwarding one or more uplink signals, received from the UE on the second band, to the base station on the first band, and communicate with the base station on the first band and the UE on the second band based on the configuration. The UE communications manager 1915 may manage communications with UEs 115 (e.g., via one or more mobile backhaul links). The base station communications manager 1920 may manage communications with base stations 105 (e.g., via one or more direct links).

The transceiver 1925 may communicate bi-directionally, via one or more antennas, wired, or wireless links as described above. For example, the transceiver 1925 may represent a wireless transceiver and may communicate bi-directionally with another wireless transceiver. The transceiver 1925 may also include a modem to modulate the packets and provide the modulated packets to the antennas for transmission, and to demodulate packets received from the antennas.

In some cases, the wireless device may include a single antenna 1930. However, in some cases the device may have more than one antenna 1930, which may be capable of concurrently transmitting or receiving multiple wireless transmissions.

The memory 1935 may include RAM, ROM, or a combination thereof. The memory 1935 may store computer-readable code 1940 including instructions that, when executed by a processor (e.g., the processor 1945) cause the device to perform various functions described herein. In some cases, the memory 1935 may contain, among other things, a BIOS which may control basic hardware or software operation such as the interaction with peripheral components or devices.

The processor 1945 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1945 may be configured to operate a memory array using a memory controller. In some cases, a memory controller may be integrated into processor 1945. The processor 1945 may be configured to execute computer-readable instructions stored in a memory (e.g., the memory 1935) to cause the device 1905 to perform various functions (e.g., functions or tasks supporting UE CoMP reception and transmission).

The code 1940 may include instructions to implement aspects of the present disclosure, including instructions to support wireless communications. The code 1940 may be stored in a non-transitory computer-readable medium such as system memory or other type of memory. In some cases, the code 1940 may not be directly executable by the processor 1945 but may cause a computer (e.g., when compiled and executed) to perform functions described herein.

Figure 20:
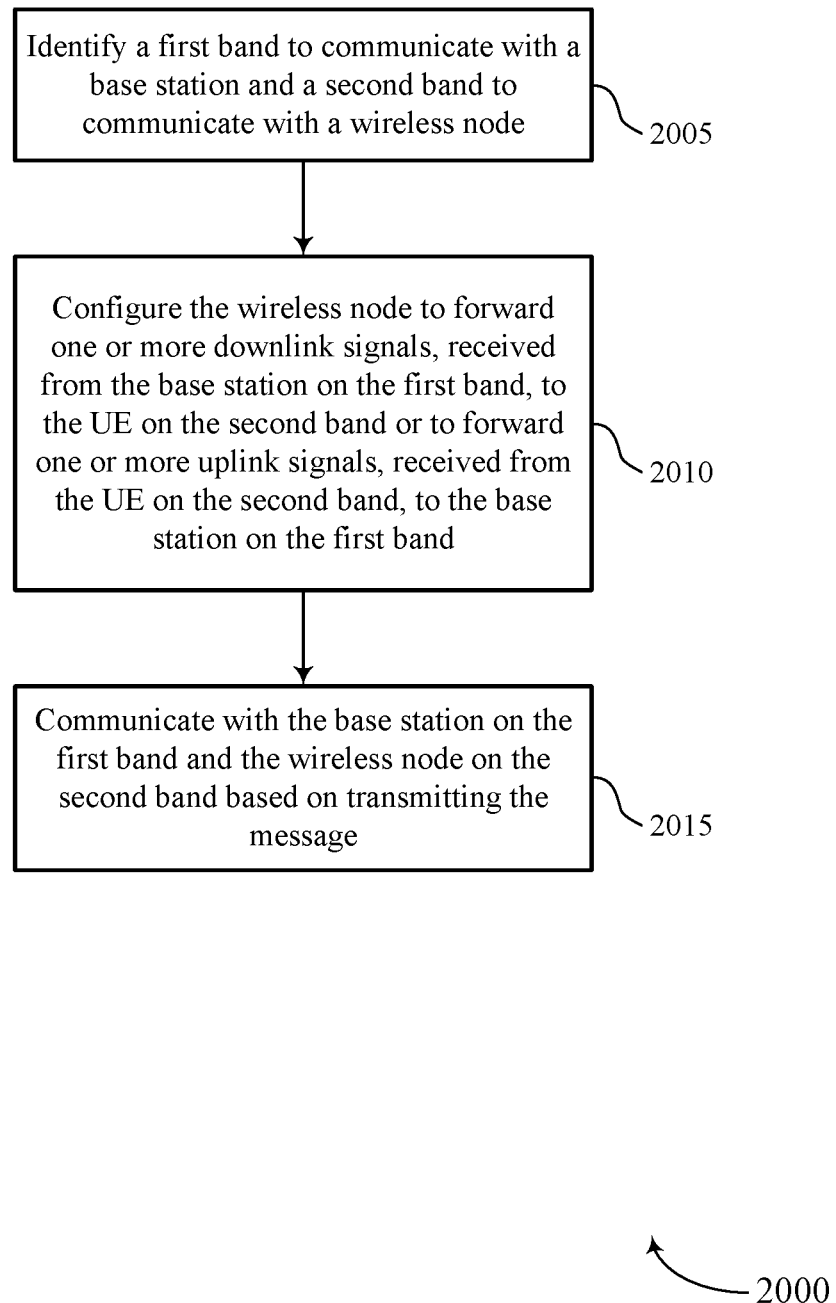
FIGS. 20 and 21 show flowcharts illustrating methods that support UE CoMP reception and transmission in accordance with one or more aspects of the present disclosure.

FIG. 20 shows a flowchart illustrating a method 2000 that supports UE CoMP reception and transmission in accordance with one or more aspects of the present disclosure. The operations of method 2000 may be implemented by a UE 115 or its components as described herein. For example, the operations of method 2000 may be performed by a communications manager as described with reference to FIGS. 12 through 15. In some examples, a UE may execute a set of instructions to control the functional elements of the UE to perform the functions described below. Additionally, or alternatively, a UE may perform aspects of the functions described below using special-purpose hardware.

At 2005, the UE may identify a first band to communicate with a base station and a second band to communicate with a wireless node. The operations of 2005 may be performed according to the methods described herein. In some examples, aspects of the operations of 2005 may be performed by a frequency resource manager as described with reference to FIGS. 12-15.

At 2010, the UE may configure the wireless node to forward one or more downlink signals, received from the base station on the first band, to the UE on the second band or to forward one or more uplink signals, received from the UE on the second band, to the base station on the first band. The operations of 2010 may be performed according to the methods described herein. In some examples, aspects of the operations of 2010 may be performed by a UE CoMP configuration manager as described with reference to FIGS. 12-15.

At 2015, the UE may communicate with the base station on the first band and the wireless node on the second band based on the configuring. The operations of 2015 may be performed according to the methods described herein. In some examples, aspects of the operations of 2015 may be performed by a UE CoMP configuration manager as described with reference to FIGS. 12-15.

Figure 21:
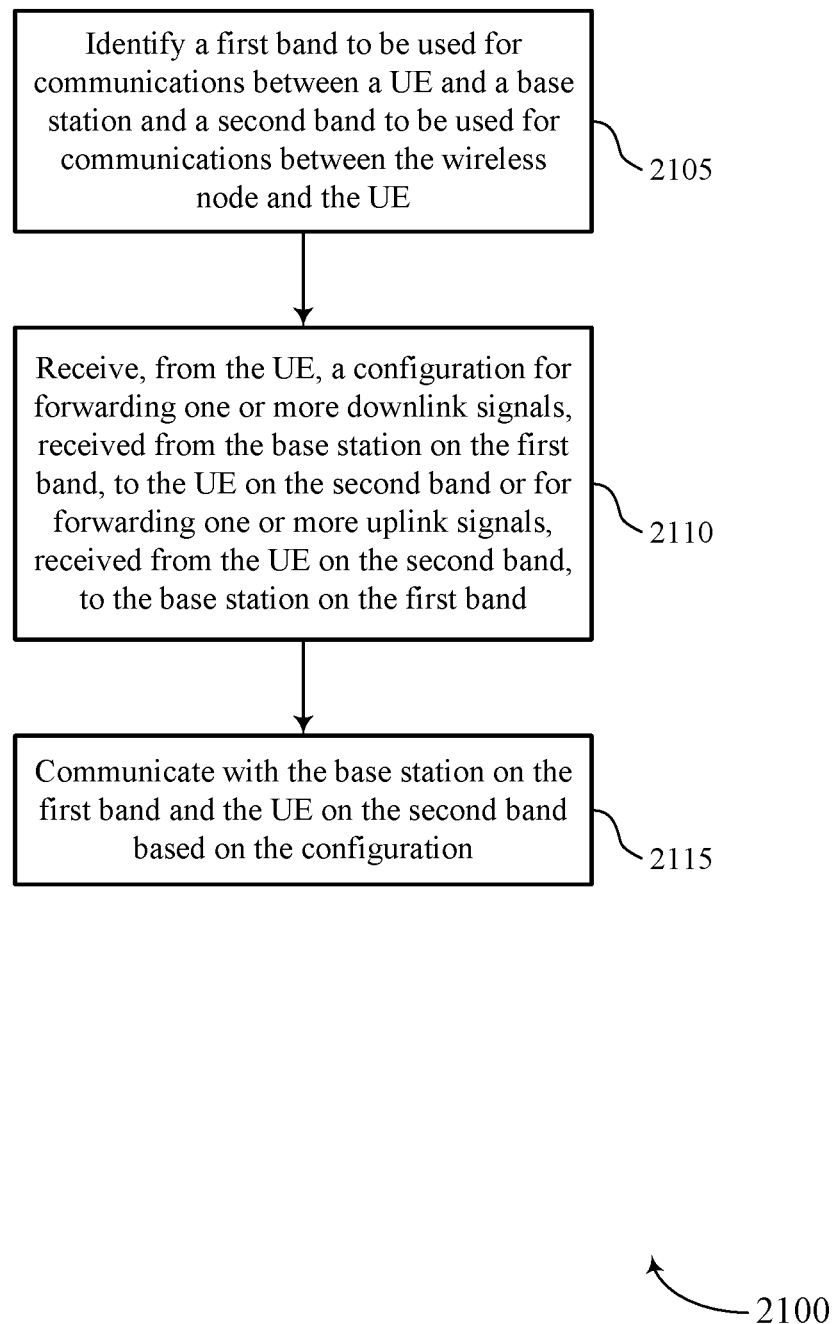

FIG. 21 shows a flowchart illustrating a method 2100 that supports UE CoMP reception and transmission in accordance with one or more aspects of the present disclosure. The operations of method 2100 may be implemented by a wireless node 110 or its components as described herein. For example, the operations of method 2100 may be performed by a communications manager as described with reference to FIGS. 16-19. In some examples, a base station may execute a set of instructions to control the functional elements of the base station to perform the functions described below. Additionally, or alternatively, a base station may perform aspects of the functions described below using special-purpose hardware.

At 2105, the base station may identify a first band to be used for communications between a UE and a base station and a second band to be used for communications between the wireless node and the UE. The operations of 2105 may be performed according to the methods described herein. In some examples, aspects of the operations of 2105 may be performed by a frequency resource manager as described with reference to FIGS. 16-19.

At 2110, the base station may receive, from the UE, a configuration for forwarding one or more downlink signals, received from the base station on the first band, to the UE on the second band or for forwarding one or more uplink signals, received from the UE on the second band, to the base station on the first band. The operations of 2110 may be performed according to the methods described herein. In some examples, aspects of the operations of 2110 may be performed by a UE CoMP configuration manager as described with reference to FIGS. 16-19.

At 2115, the base station may communicate with the base station on the first band and the UE on the second band based on the configuration. The operations of 2115 may be performed according to the methods described herein. In some examples, aspects of the operations of 2115 may be performed by a UE CoMP configuration manager as described with reference to FIGS. 16-19.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a first band for direct communications between the UE and a base station and a second band for indirect communications between the UE and the base station via a wireless node;
    configuring, by the UE, the wireless node to forward one or more downlink signals, received from the base station on the first band, to the UE on the second band or to forward one or more uplink signals, received from the UE on the second band, to the base station on the first band; and
    communicating with the base station on the first band and the wireless node on the second band based at least in part on the configuring.

2. The method of claim 1, wherein configuring the wireless node to forward the one or more downlink signals or the one or more uplink signals comprises:
    transmitting, from the UE, a configuration message to the wireless node indicating that the wireless node is to forward the one or more downlink signals to the UE and forward the one or more uplink signals to the base station.

3. The method of claim 1, wherein communicating with the base station on the first band and the wireless node on the second band comprises:
    communicating directly with the base station on the first band; and communicating indirectly with the base station via the wireless node on the second band using virtual multiple-input multiple-output (MIMO).

4. The method of claim 1, wherein the wireless node is a remote radio head for the UE.

5. The method of claim 1, wherein the communicating comprises:
   determining that the one or more downlink signals are scheduled to be transmitted to the UE from the base station on the first band; and
   receiving, from the wireless node on the second band, at least a subset of the one or more downlink signals scheduled to be transmitted to the UE from the base station.

6. The method of claim 5, wherein the receiving comprises:
   receiving, from the wireless node on the second band, all of the one or more downlink signals scheduled to be transmitted to the UE from the base station.

7. The method of claim 5, wherein the receiving comprises:
   receiving, from the base station on the first band, a first subset of the one or more downlink signals scheduled to be transmitted to the UE from the base station; and
   receiving, from the wireless node on the second band, a second subset of the one or more downlink signals scheduled to be transmitted to the UE from the base station.

8. The method of claim 5, wherein configuring the wireless node to forward the one or more downlink signals comprises:
   configuring the wireless node to forward the at least the subset of the one or more downlink signals scheduled to be transmitted to the UE from the base station.

9. The method of claim 1, wherein the communicating comprises:
   identifying the one or more uplink signals to be transmitted to the base station; and
   transmitting at least a subset of the one or more uplink signals to the wireless node on the second band, wherein the at least the subset of the one or more uplink signals is to be forwarded by the wireless node to the base station on the first band.

10. The method of claim 9, wherein the transmitting comprises:
    transmitting all of the one or more uplink signals to the wireless node on the second band, wherein all of the one or more uplink signals are to be forwarded by the wireless node to the base station on the first band.

11. The method of claim 9, further comprising:
    transmitting a first subset of the one or more uplink signals to the base station on the first band; and
    transmitting a second subset of the one or more uplink signals to the wireless node on the second band, wherein the second subset of the one or more uplink signals is to be forwarded by the wireless node to the base station on the first band.

12. The method of claim 9, wherein configuring the wireless node to forward the one or more uplink signals comprises:
    configuring the wireless node to forward the at least the subset of the one or more uplink signals transmitted to the wireless node on the second band to the base station on the first band.

13. The method of claim 1, wherein configuring the wireless node to forward the one or more downlink signals or the one or more uplink signals comprises:
    configuring, by the UE, a format for forwarding the one or more downlink signals or the one or more uplink signals.

14. The method of claim 13, wherein the one or more downlink signals or the one or more uplink signals are forwarded in the form of raw or compressed in-phase (I) and quadrature (Q) samples of the one or more downlink signals or the one or more uplink signals.

15. The method of claim 13, wherein the one or more downlink signals are forwarded in the form of decoded transport blocks, decoded control information, or both.

16. The method of claim 1, further comprising:
    communicating with the base station to determine an updated hybrid automatic repeat request (HARQ) timeline for providing HARQ feedback to the base station for the one or more downlink signals.

17. The method of claim 1, wherein the UE is configured to communicate with the base station on the first band using a first set of antennas, and the UE is configured to communicate with the wireless node on the second band using a second, additional set of antennas.

18. A method for wireless communication at a wireless node, comprising:
    identifying a first band to be used for direct communications between a user equipment (UE) and a base station and a second band to be used for indirect communications between the UE and the base station via the wireless node;
    receiving, from the UE, a configuration for forwarding one or more downlink signals, received from the base station on the first band, to the UE on the second band or for forwarding one or more uplink signals, received from the UE on the second band, to the base station on the first band; and
    communicating with the base station on the first band and the UE on the second band based at least in part on the configuration.

19. The method of claim 18, wherein communicating with the base station on the first band and the UE on the second band comprises:
    forwarding the one or more downlink signals from the base station to the UE and the one or more uplink signals from the UE to the base station to facilitate indirect communications between the UE and the base station using virtual multiple-input multiple-output.

20. The method of claim 18, wherein the wireless node is a remote radio head for the UE.

21. The method of claim 18, wherein the communicating comprises:
    monitoring the first band for the one or more downlink signals scheduled to be transmitted by the base station to the UE on the first band;
    receiving the one or more downlink signals on the first band; and
    transmitting, to the UE on the second band, at least a subset of the one or more downlink signals received on the first band.

22. The method of claim 21, wherein the transmitting comprises:
    transmitting, to the UE on the second band, all of the one or more downlink signals received on the first band.

23. The method of claim 21, wherein a first subset of the one or more downlink signals received on the first band are received by the UE from the base station on the first band, and wherein the transmitting comprises:

transmitting, to the UE on the second band, a second subset of the one or more downlink signals received on the first band.

24. The method of claim 21, wherein the configuration for forwarding the one or more downlink signals or the one or more uplink signals, received from the UE, indicates that the wireless node is to forward the at least the subset of the one or more downlink signals to the UE.

25. The method of claim 18, wherein the communicating comprises:
   monitoring the second band for the one or more uplink signals from the UE to be forwarded to the base station on the first band;
   receiving the one or more uplink signals on the second band; and
   transmitting the one or more uplink signals received on the second band to the base station on the first band.

26. The method of claim 18, wherein the configuration for forwarding the one or more downlink signals or the one or more uplink signals, received from the UE, indicates a format for forwarding the one or more downlink signals or the one or more uplink signals.

27. The method of claim 26, wherein the one or more downlink signals or the one or more uplink signals are forwarded in the form of raw or compressed in-phase (I) and quadrature (Q) samples of the one or more downlink signals or the one or more uplink signals based at least in part on the configuration.

28. The method of claim 26, wherein the one or more downlink signals are forwarded in the form of decoded transport blocks, decoded control information, or both based at least in part on the configuration.

29. An apparatus at a user equipment (UE) comprising:
   a processor; and
   memory coupled to the processor, the processor and memory configured to:
      identify a first band for direct communications between the UE and a base station and a second band for indirect communications between the UE and the base station via a wireless node;
      configure, by the UE, the wireless node to forward one or more downlink signals, received from the base station on the first band, to the UE on the second band or to forward one or more uplink signals, received from the UE on the second band, to the base station on the first band; and
      communicate with the base station on the first band and the wireless node on the second band based at least in part on the configuring.

30. An apparatus at a wireless node comprising:
   a processor; and
   memory coupled to the processor, the processor and memory configured to:
      identify a first band to be used for direct communications between a user equipment (UE) and a base station and a second band to be used for indirect communications between the UE and the base station via the wireless node;
      receive, from the UE, a configuration for forwarding one or more downlink signals, received from the base station on the first band, to the UE on the second band or for forwarding one or more uplink signals, received from the UE on the second band, to the base station on the first band; and
      communicate with the base station on the first band and the UE on the second band based at least in part on the configuration.

31. An apparatus at a user equipment (UE) comprising:
   means for identifying a first band for direct communications between the UE and a base station and a second band for indirect communications between the UE and the base station via a wireless node;
   means for configuring, by the UE, the wireless node to forward one or more downlink signals, received from the base station on the first band, to the UE on the second band or to forward one or more uplink signals, received from the UE on the second band, to the base station on the first band; and
   means for communicating with the base station on the first band and the wireless node on the second band based at least in part on the configuring.

32. An apparatus at a wireless node comprising:
   means for identifying a first band to be used for direct communications between a user equipment (UE) and a base station and a second band to be used for indirect communications between the UE and the base station via the wireless node;
   means for receiving, from the UE, a configuration for forwarding one or more downlink signals, received from the base station on the first band, to the UE on the second band or for forwarding one or more uplink signals, received from the UE on the second band, to the base station on the first band; and
   means for communicating with the base station on the first band and the UE on the second band based at least in part on the configuration.

33. A non-transitory computer-readable medium storing code for wireless communication at a user equipment (UE), the code comprising instructions executable by a processor to:
   identify a first band for direct communications between the UE and a base station and a second band for indirect communications between the UE and the base station via a wireless node;
   configure, by the UE, the wireless node to forward one or more downlink signals, received from the base station on the first band, to the UE on the second band or to forward one or more uplink signals, received from the UE on the second band, to the base station on the first band; and
   communicate with the base station on the first band and the wireless node on the second band based at least in part on the configuring.

34. A non-transitory computer-readable medium storing code for wireless communication at a wireless node, the code comprising instructions executable by a processor to:
   identify a first band to be used for direct communications between a user equipment (UE) and a base station and a second band to be used for indirect communications between the UE and the base station via the wireless node;
   receive, from the UE, a configuration for forwarding one or more downlink signals, received from the base station on the first band, to the UE on the second band or for forwarding one or more uplink signals, received from the UE on the second band, to the base station on the first band; and
   communicate with the base station on the first band and the UE on the second band based at least in part on the configuration.

* * * * *